Sept. 12, 1967 H. M. SKOWRON 3,340,993
WORKPIECE HANDLING APPARATUS
Filed Nov. 2, 1966 9 Sheets-Sheet 1

INVENTOR.
HENRY M. SKOWRON
BY Charles W. Gregg
AGENT

INVENTOR.
HENRY M. SKOWRON
BY Charles W. Gregg
AGENT

INVENTOR.
HENRY M. SKOWRON
BY Charles W. Gregg
AGENT

Sept. 12, 1967 H. M. SKOWRON 3,340,993

WORKPIECE HANDLING APPARATUS

Filed Nov. 2, 1966 9 Sheets-Sheet 4

INVENTOR.
HENRY M. SKOWRON

BY Charles W. Gregg

AGENT

WORKPIECE HANDLING APPARATUS

Filed Nov. 2, 1966 9 Sheets-Sheet 5

*INVENTOR.*
HENRY M. SKOWRON
*BY* Charles W. Gregg
AGENT

INVENTOR.
HENRY M. SKOWRON
BY Charles W. Gregg
AGENT

INVENTOR.
HENRY M. SKOWRON
BY
Charles W. Gregg
AGENT

WORKPIECE HANDLING APPARATUS

Filed Nov. 8, 1966 9 Sheets-Sheet 8

INVENTOR.
HENRY M. SKOWRON

BY Charles W. Gregg
AGENT

INVENTOR.
HENRY M. SKOWRON
BY Charles W. Gregg
AGENT

United States Patent Office 3,340,993

Patented Sept. 12, 1967

3,340,993
WORKPIECE HANDLING APPARATUS

Henry M. Skowron, Corning, N.Y., assignor to Corning Glass Works, Corning, N.Y., a corporation of New York Filed Nov. 2, 1966, Ser. No. 591,465
5 Claims. (Cl. 198—33)

The present invention relates to workpiece handling apparatus. More particularly, the present invention relates to apparatus for conveying and orienting workpieces, and feeding the oriented workpieces to a machine for operations or work to be performed on such workpieces. Still more specifically, the invention relates to apparatus for conveying and positioning in a desired orientation each of a series of workpieces comprising a collinear, end-to-end succession of substantially identical lengths of pipe or tubings having one rounded or similarly tapered end, and feeding each such length of pipe or tubing in said desired orientation to a machine for work to be performed on each respective workpiece.

For purposes of performing work or operations on workpieces by a machine it is oftentimes necessary that the workpieces be supplied or fed to the machine in a selected orientation so that workpiece supports, such as mandrels or chucks, on the machine can hold the workpieces in a proper position for the performance of said operations or work thereon. When a machine receiving said workpieces operates at a relatively slow rate of speed, the supply or feeding of the workpieces to the machine can oftentimes be conveniently performed by hand. However, in a machine such as that mentioned but which operates at a relatively high rate of speed it is sometimes impractical or impossible to feed workpieces thereto by hand. Furthermore, for obvious economic reasons, it is oftentimes desirable that automatic apparatus be provided for orienting and feeding workpieces to a machine rather than manually supplying the workpieces thereto. For example, in one type of machine such as that mentioned a succession of mandrels or chucks on the machine are successively presented at a relatively high rate of speed to a machine loading station for receipt on or in each said mandrel or chuck of the open end of one of a plurality of lengths of pipe or tubings each having one rounded or similarly tapered end on which operations are to be performed, by a tool or tools associated with the machine, at a station or stations located subsequent to said loading station. When said lengths of pipe or tubings are metal tubings, for example, it may be desired that the rounded or similarly tapered ends of the tubings be ground or polished and said machine may then present either a series of mandrels or a series of chucks to said loading station for receipt on each such mandrel or in each such chuck of the open end of each of said tubings. Similarly, the machine may carry a succession of chucks which are successively presented to a machine loading station for receipt in each such chuck of the rounded or similarly tapered end of one of a plurality of lengths of pipe or tubings each having one such end and the open end of the tubing being the end on which operations are to be performed at a station or stations located subsequent to said loading station. When the tubings are metal, for example, such operations may comprise the reaming of the open end of each of the tubings carried by said chucks. In any event, it is apparent that such lengths of pipe or tubings must be supplied to a machine loading station in a selected position, depending on the operations to be performed on the tubings. That is, all of the lengths of pipe or tubings must be supplied to a machine loading station with either their open ends presented to workpiece supports such as chucks or mandrels carried by the respective machine, or with their rounded or similarly tapered ends presented to workpiece supports such as chucks carried by the respective machine.

It is, accordingly, one object of the present invention to provide apparatus for conveying and orienting in a selected position each of a plurality of lengths of pipe or tubings having one tapered end, and supplying or feeding each said tubing in its oriented position to a machine for operations to be performed on the tubing.

It is another object of the invention to provide article or workpiece handling apparatus which longitudinally orients tubings having one tapered end so that such end of each tubing of a succession of such tubings is faced in the same direction as the tapered end of each of the other tubings of such succession.

It is a third object of the invention to provide an apparatus which sequentially, rapidly and identically longitudinally orients each of a succession of substantially identical tubings or lengths of pipe each having one rounded or similarly tapered end.

In accomplishing the above objects of the invention, there is provided an apparatus including means for sequentially receiving the leading end of each one of a moving collinear and end-to-end succession of lengths of pipe or tubings each having one rounded or similarly tapered end, each successive tubing following the preceding one with the tapered and open ends of the tubings arranged in random sequence relative to each other, and conveying said tubings to a first rotating drum, such drum receiving and sequentially conveying said tubings in a preselected arc of travel and thereafter sequentially longitudinally ejecting each such tubing therefrom with the tapered end thereof as the leading end of each respective tubing; and means for sequentially receiving each such ejected tubing and sequentially conveying each successive tubing with the tapered end thereof as its leading end to a second rotating drum, such second drum sequentially receiving and conveying said tubings in a preselected arc of travel while simultaneously sequentially raising each successive tubing to a vertical position with the tapered end thereof in a preselected position, and thereafter sequentially vertically dropping each tubing and thereby sequentially supplying the tubings to workpiece supports located below said drum and on a machine which is to perform operations on the tubings.

Other objects and characteristic features of the invention will become apparent as the description proceeds.

The invention will best be understood with reference to the accompanying drawings wherein:

FIG. 1 comprises a side elevational view of one form of apparatus embodying the invention;

FIG. 2 is a top plan view of a part of the apparatus of FIG. 1 taken substantially along line II—II of FIG. 1;

FIGS. 3, 4 and 5 comprise sectional plan views of parts of the apparatus of FIG. 1 taken substantially along lines III—III, IV—IV and V—V, respectively, of FIG. 1;

FIG. 5*a* comprises a detail view taken substantially along line V*a*—V*a* of FIG. 5;

FIG. 6 comprises a sectional side view of a part of the apparatus of FIG. 1 taken substantially along line VI—VI of FIG. 2;

Figure 1:
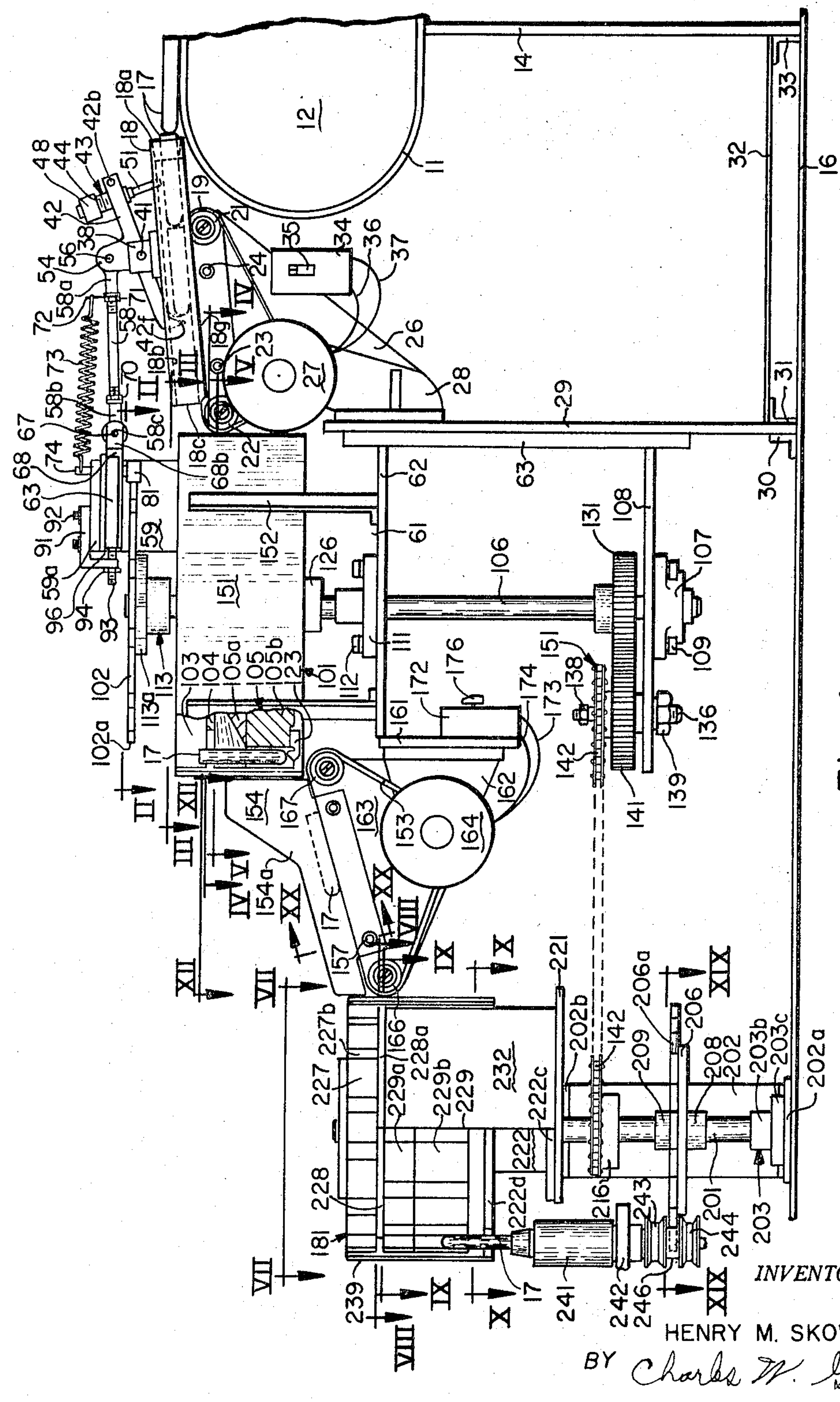
Figure 6:
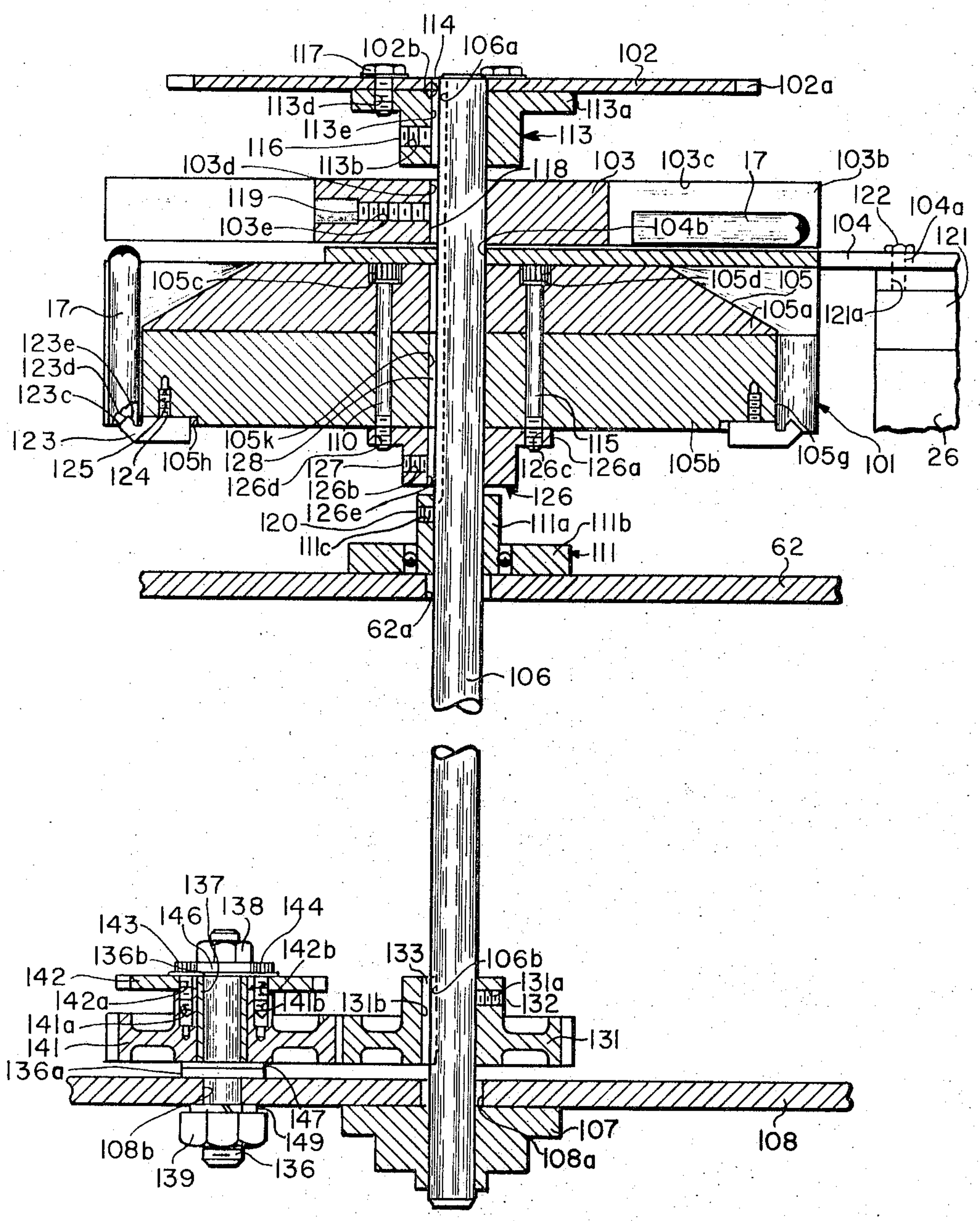
Figure 11:
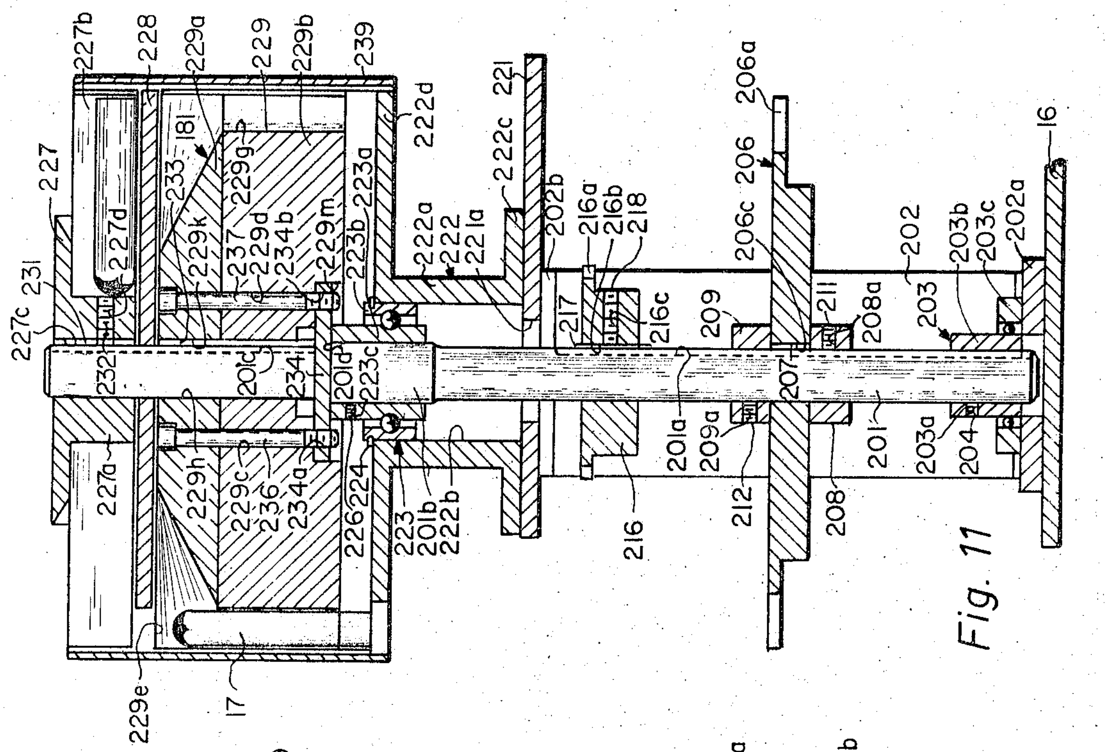
Figure 7:
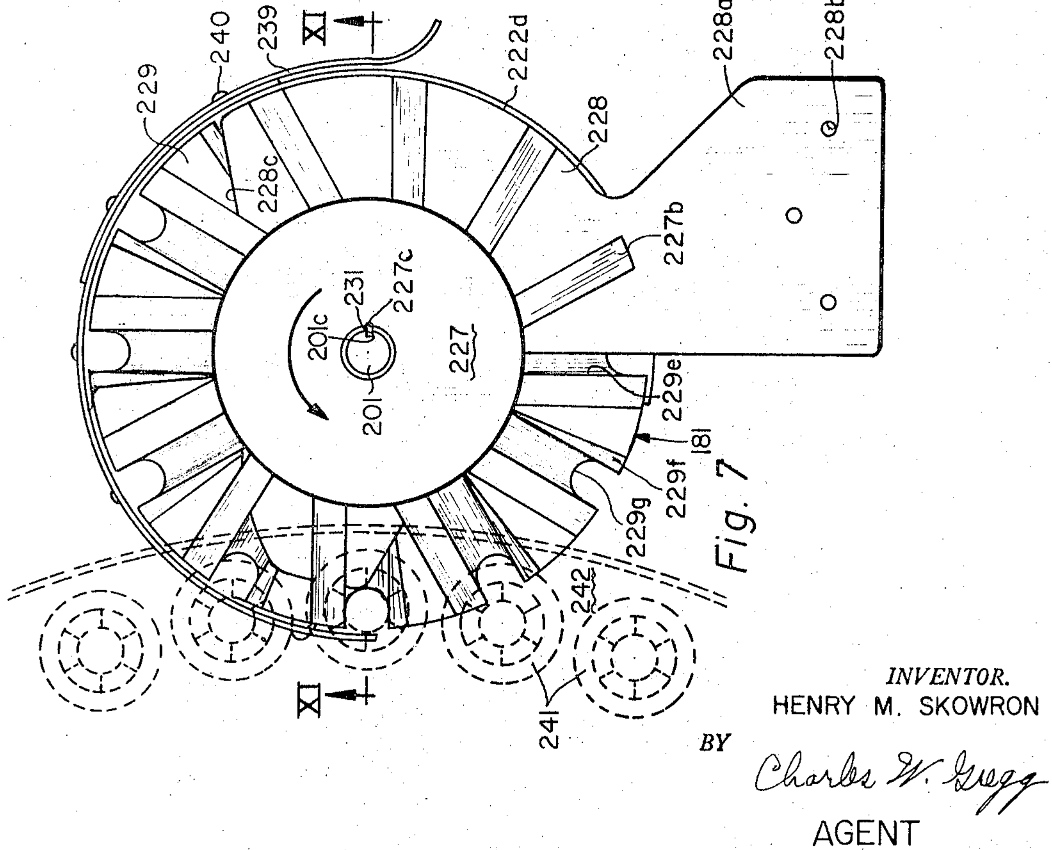
FIG. 7 is a top plan view similar to FIG. 2 and taken substantially along line VII—VII of FIG. 1.
Figure 9:
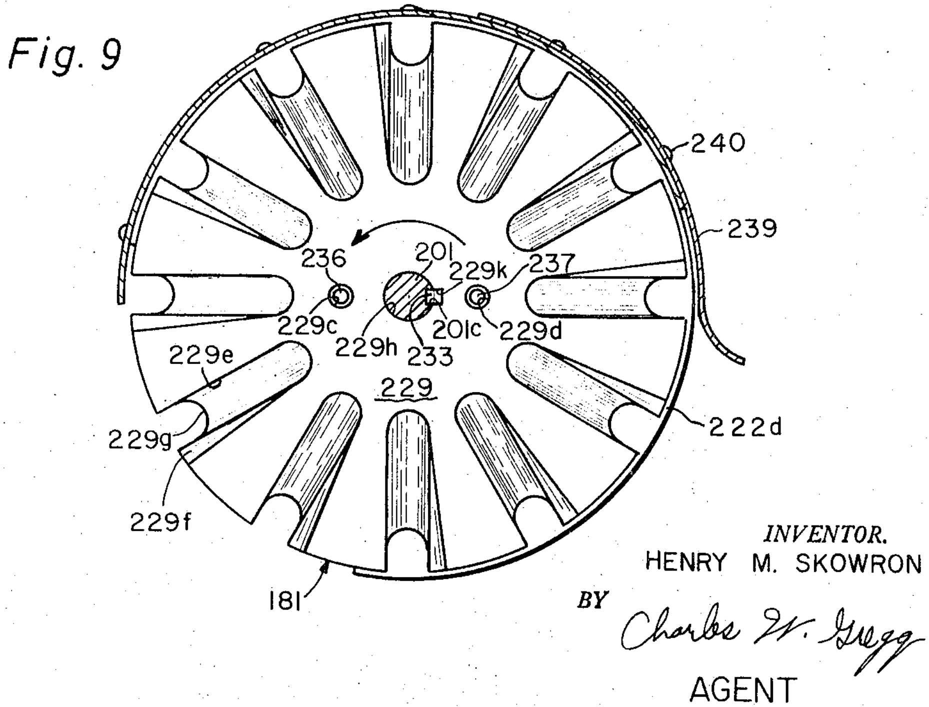
Figure 12:
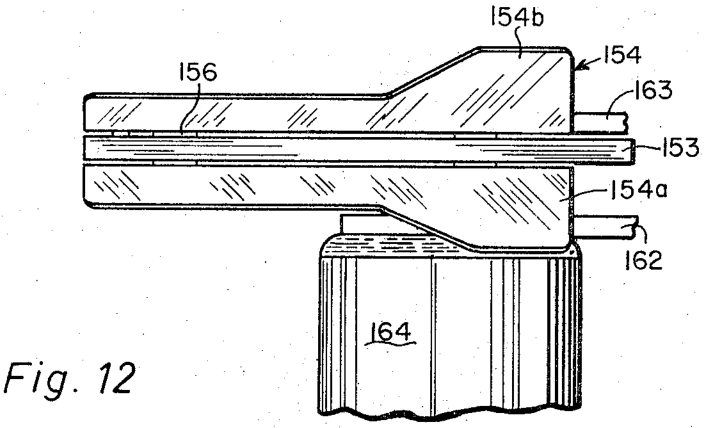
Figures 13, 14, 15, 16, 17, 18:
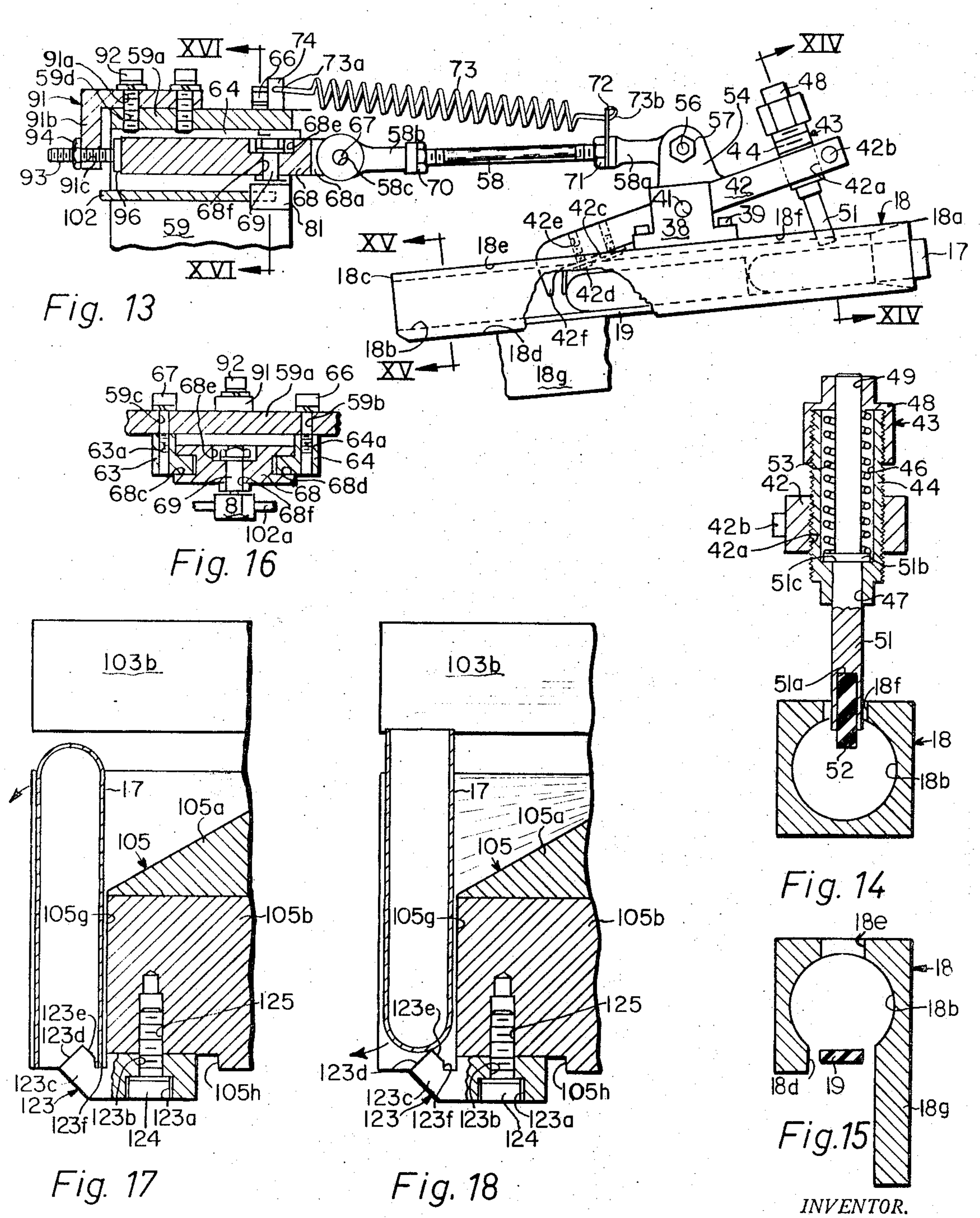
Figure 19:
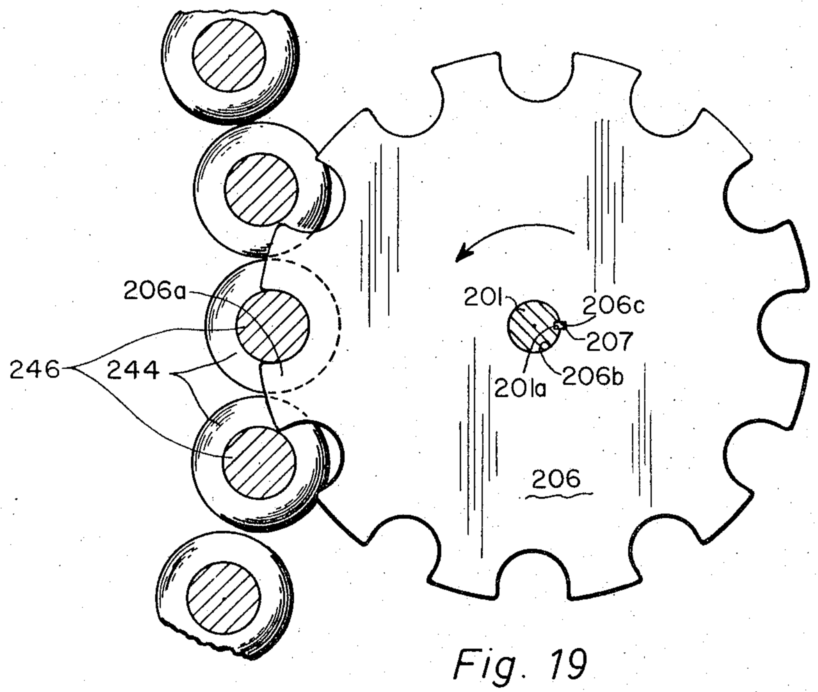
Figure 20:
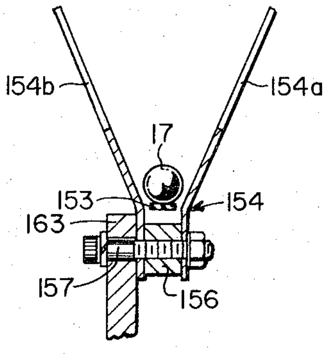

FIG. 11 comprises a sectional side view similar to FIG. 6 taken substantially along line XI—XI of FIG. 7;

FIG. 12 is a top plan view of a part of the apparatus of FIG. 1 taken substantially along line XII—XII of FIG. 1;

FIG. 13 comprises a side elevational detail view, on a enlarged scale and partially in cross-section, of a part of the apparatus embodying the invention;

FIG. 14 is a cross-sectional view taken substantially along the line XIV—XIV of FIG. 13;

FIG. 15 is a cross-sectional view taken substantially along line XV—XV of FIG. 13;

FIG. 16 is a cross-sectional view taken substantially along line XVI—XVI of FIG. 13;

FIGS. 17 and 18 comprise enlarged detailed cross-sectional views of a part of the apparatus shown in FIGS. 1 and 9;

FIG. 19 comprises a sectional plan view of a part of the apparatus of FIG. 1 taken substantially along line XIX—XIX of FIG. 1; and FIG. 20 is a cross-sectional view taken substantially along line XX—XX of FIG. 1.

Similar reference characters refer to similar parts in each of the figures of the drawings.

Referring to FIG. 1 of the drawings, there is shown a conveyor belt 11 associated with a hopper 12 which is supported on legs, such as 14, mounted on a floor or a platform 16. Belt 11 of hopper 12 conveys a continuous succession of longitudinally aligned lengths of pipe or tubing, such as 17 and each having one rounded end, to the entrance end 18*a* of a channel 18*b* in a trough or chute 18 to be hereinafter further discussed. Hopper 12 per se forms no part of the present invention but is a commercially available device such as, for example, a Model 330–INM Non-Mar Hopper manufactured and sold by Industrial and Automation Products Division of Radio Corporation of America, the address of such division being 41225 Plymouth Road, Plymouth, Mich. Such hopper is illustrated and described in Catalog A–1050–R published by said division, and reference may be made to such catalog if more details of the hopper than those shown in FIG. 1 of the drawings are desired.

As shown in FIGS. 1 and 13 the succession of lengths of pipe or tubings, such as 17, being fed from conveyor belt 11 of previously mentioned hopper 12 are supplied to entrance end 18*a* of channel 18*b* in previously mentioned chute or trough 18 and each preceding tubing is pushed into the section of channel 18*b* adjacent entrance end 18*a* of chute 18 by the succeeding tubing just behind each such preceding tubing. As illustrated in FIGS. 1, 13 and 15, the bottom of approximately the last two thirds of chute 18, that is, approximately two thirds of the length of chute 18 extending from an exit end 18*c* thereof towards entrance end 18*a* of the chute, is provided with an open longitudinal slot 18*d* (FIG. 15) in which is disposed and supported a conveyor belt 19. Belt 19 extends about a pulley (not shown) on the output shaft (also not shown) of a first variable speed D.C. electric motor 27 and thence around pulleys 21 and 22 which are rotatably mounted on an extension 18*g* of the rear side of chute 18 (when viewings FIGS. 1 and 13) that is, the right hand side of chute 18 when viewing FIG. 15. Chute 18 is mounted on a suitable support 26 by bolts 23 and 24 extending through suitable holes provided in side 18*g* of the chute and screwed into cooperatively threaded holes provided in support 26. Motor 27, which will be discussed further hereinafter, is face mounted on a support 28 in any suitable manner. Supports 26 and 28 are in turn attached, as by welding for example, to an upright support 29 adjacent the upper end thereof. The lower end of support 29 is mounted on the floor or platform 16 and is secured thereto by an L-shaped brace 30. A spacing bar on plate 32 is secured to leg 14 of hopper 12 and to support 29 by L-shaped braces 33 and 31, respectively. Spacing bar or plate 32 helps to maintain belt 11 of hopper 12 in the proper spaced relationship with chute 18.

As will be apparent from the above description, rotation of the output shaft of motor 27 correspondingly drives conveyor belt 19. Motor 27 is, therefore, to be energized with a suitable polarity of electrical current to cause belt 19 to move in a counterclockwise direction when viewing FIG. 1. Tubings such as 17 will thus be conveyed by belt 19 through channel 18*b* provided in chute 18 in a direction from right to left when viewing FIGS. 1 and 13, that is, in a direction from the entrance end 18*a* of channel 18*b* in chute 18 towards the exit end 18*c* of such channel. In order to provide control of the rate of speed of motor 27 and, thereby, the rate of speed of the movement of belt 19, a motor speed control 34 (FIG. 1) is provided and is mounted in any suitable manner, as by suitable supporting brackets for example, on support 26. Two wires or electrical leads 36 and 37 connect motor speed control 34 with motor 27. Motor speed control 34, as well as controlling the speed of motor 27 by regulating the amount of current supplied to the motor in accordance with the annual adjustment of an adjustable dial 35 (FIG. 1) on the control, also provides full wave rectification of alternating current supplied to the control from a suitable source of such current. For purposes of simplification of the drawings, however, such source of current is not shown therein.

Variable speed direct current motors are well known and motor 27 may, for example, be a 1/12 H.P. motor such as manufactured and sold by Boston Gear Works, 14 Hayward St., Quincy, Mass., and listed under Catalog Number AASD on page 15 of Catalog VR 262 published by such company. Similarly, speed control 34 may, for example, be a Ratiotrol® speed control also manufactured and sold by Boston Gear Works and listed under Catalog Number R12 on page 15 of the above catalog. If additional information on said motor and control is desired, reference is made to said Catalog VR 262 published by Boston Gear Works.

Referring again to FIGS. 1 and 13 of the drawings, and as best shown in FIG. 13, there is mounted on the upper side of chute 18 by threaded bolts such as 39, an upright support 38 which pivotally supports, by an axle or pivot pin 41, a tubing gating device 42 which controls the movement of tubings, such as 17, through channel 18*b* in chute 18 by, at selected first times, preventing such movement and, at selected other times, permitting the movement of a single tubing through said channel. This will be a further discussed hereinafter.

The end of gating device 42, adjacent entrance end 18*a* of channel 18*b* in chute 18, is split and there is provided adjacent such end of the device, a tubing contactor 43 (FIGS. 1, 13 and 14) which comprises an externally threaded cylinder 44 having a first relatively large diameter axial bore 46 (FIG. 14) at its upper end and an axial bore 47 of a smaller diameter at its lower end. Cylinder 44 is screwed into cooperating threads provided in a hole 42*a* extending through said split end of device 42 and a bolt 42*b* extends laterally through such end of device 42 and may be tightened to draw the parts of the split end together and thereby immovably clamp cylinder 44 within hole 42*a*. A cap nut 48 having internal threads cooperative with the external threads on cylinder 44 is screwed onto the top of such cylinder. The top of cap nut 48 is provided with a bore 49 extending axially therethrough and having a diameter somewhat smaller than bore 46 in cylinder 44 (FIG. 14). A rod 51, whose upper half has a diameter corresponding to that of bore 49 and whose lower half has a diameter corresponding to that of bore 47, extends through such bores and also through bore 46 in cylinder 44. Rod 51 fits snugly but longitudinally slidable within bores 47 and 49, and the lower end of the rod externally protrudes from bore 47 into and through an orifice or slot 18*f* (FIG. 14) provided in the top wall of chute 18 adjacent entrance end 18*a* of channel 18*b* in such chute. The lower end of rod 51 is provided with an orifice 51*a* in which is secured a tubing contacting member 52 of resilient material, such as soft rubber for example (FIG. 14). Rod 51 is also provided with a collar 51*b* which surrounds and is affixed in any convenient manner to the upper part of rod 51 and rests against a shoulder 51*c* on the rod, such shoulder being provided by and at the juncture of the two different diameters of the upper and lower halves of rod 51. A compressible coil spring 53 surrounds the part of the upper half of rod 51 which extends through bore 46 of cylinder 44, and bears at its upper end against cap nut 48 and at its lower end against collar 51*b* on rod 51. Rod 51 is, thereby, normally spring biased to its lowermost possible position as shown in FIG. 14 of the drawings, that is, with the lower half of the rod externally protruding to the extent possible out of orifice 47 in cylinder 44. Such protrusion of the rod is limited by collar 51*b* affixed thereto. When member 52, disposed in orifice 51*a* in the lower part of rod 51, contacts the outer periphery of a tubing, as hereinafter discussed, rod 51 can be moved upwardly in bores 47 and 49 against the spring bias provided by coil spring 53. This is apparent from a brief glance at FIG. 14 of the drawings.

The end of device 42 opposite that in which tubing contactor 43 is secured is provided with a thin resilient metal tubing stop 42*c* (FIG. 13) which is secured to the bottom surface of device 42 by screws such as 42*d* screwed into cooperatively threaded holes such as 42*e* provided adjacent said end of device 42. The end of stop 42*c* nearest the exit end of channel 18*b* in chute 18 curves or is turned downwardly away from the bottom surface of device 42 and provides a tubing contacting part of stop 42*c*. The corresponding end of device 42 is provided with a downwardly extending portion 42*f* which provides a backup for the tubing contacting part of stop 42*c*. When device 42 is in its tubing stopping position shown in FIG. 13, said portion 42*f* of device 42 and the curved end of stop 42*c* extend downward through a slot 18*e* provided in the top wall of chute 18 and thence into channel 18*b* of such chute. This will be discussed further hereinafter in an operational description of the invention.

The top of device 42 is also provided with an upwardly extending portion approximately midway between the ends of such device and forming a lug 54 to which is pivotally attached as by an axle or pivot pin 56, an end part 58*a* of an adjustable length actuating rod 58. A nut 57 secures axle 56 to lug 54 and, thereby, said end part 58*a* of rod 58 to such lug in pivotal relationship therewith.

The end part of rod 58, opposite to end part 58*a* attached to lug 54 as discussed above, is designated 58*b* and is pivotally connected, by an axle or pivot pin 67 extending through a hole 58*c* in end part 58*b* of rod 58, between a pair of horizontally extending and spaced apart lugs 68*a* and 68*b* (FIGS. 13 and 1, respectively) provided on the end of a slide member 68 (FIG. 16) to be discussed hereinafter. Rod 58 is threaded adjacent end parts 58*a* and 58*b* thereof, and lock nuts 71 and 70, respectively, are screwed onto the threads so provided on rod 58. It will be understood that the threads on rod 58 are so arranged that the turning of rod 58 in one direction will shorten such rod while turning the rod in the opposite direction will lengthen it. Such arrangements are well known.

A C-shaped bracket 59 (FIGS. 1, 13 and 16) is secured as by welding, to the top surface of a support plate 62 which is, in turn, secured to the side of a support plate 63 attached to previously mentioned upright support 29. A pair of spaced apart slideways 63 and 64 (FIG. 16) are secured to the bottom surface of the top horizontally extending arm 59*a* of bracket 59 by bolts, such as 66 and 67, extending through holes, such as 59*b* and 59*c* in arm 59*a*, and thence into cooperatively threaded holes, such as 64*a* and 63*a*, respectively, provided in slideways 64 and 63, respectively. Previously mentioned slide member 68 is carried by slideways 63 and 64 in slidable relationship therewith, such slide member having channels 68*c* and 68*d* (FIG. 16) cooperative with slideways 63 and 64, respectively. The top of slide member 68 is provided with a countersunk hole 68*e* (FIGS. 13 and 16) which contains the head of a pivot pin or axle 69, such pin or axle extending downward through a hole 68*f* in slide member 68 and of a smaller diameter than hole 68*e*. Pin or axle 69 carries on its lower end a roller or cam follower 81 which is freely rotatable on such pin or axle and is intended to follow the configuration of a scalloped peripheral edge 102*a* of a cam 102 (FIGS. 1, 2, 13 and 16) to be discussed hereinafter.

An L-shaped bracket 91 is fastened to the top of arm 59*a* of bracket 59 by bolts such as 92 extending through holes, such as 91*a*, provided in bracket 91 and screwed into cooperating threads provided in holes, such as 59*d*, in arm 59*a* of bracket 59. Arm 91*b* of bracket 91 also embodies a threaded hole 91*c* in and through which is screwed a set screw 93 which is adjustable within such hole. A lock nut 94 on set screw 93 can be tightened to lock such set screw in the position to which it is screwed through hole 91*c*. A bumper plate 96 is secured in any convenient manner on the inner end of set screw 93. It is, therefore, readily apparent that set screw 93 and bumper plate 96 provided on the inner end of the set screw can be adjusted to limit the sliding movement of slide member 68 in its left hand direction (viewing FIGS. 1 and 13).

An upstanding lug 74 (FIGS. 1 and 13) is also provided on the top of arm 59*a* of bracket 59 and secured thereto in any convenient manner. A first end 73*a* of a coil spring 73 is attached in any suitable manner to lug 74. Another lug 72 is provided on end part 58*a* of rod 58 and is secured thereto by previously mentioned nut 71. A second end 73*b* of coil spring 73 extends through a hole provided in lug 72 and hooks about such lug for attachment thereto. Spring 73 is maintained under tension and, therefore, biases rod 58, and slide member 68 and its associated cam follower or roller 81, to their positions shown in FIGS. 1 and 13. Spring 73 also biases previously mentioned gating device 42 to its position shown in FIGS. 1 and 13. The operation of the apparatus of FIG. 13 will be discussed in detail hereinafter in an operational example of the apparatus embodying the invention.

Referring to FIGS. 1 and 6, there is shown a vertically disposed rotatable axle 106 whose bottom end extends through, and is supported by and in, a rotary bearing 107 which is in turn secured to the bottom surface of a horizontal support plate 108 as by bolts such as 109 (FIG. 1). Axle 106 extends through a hole 108*a* provided in plate 108 and is free to rotate therein. Plate 108 is affixed to previously mentioned vertical plate 63 in any suitable and convenient manner, such as by welding for example. Axle 106 also extends through and is supported, at approximately the center of the length of the axle, by and in the inner portion 111*a* (FIG. 6) of a rotary bearing 111, the outer portion 111*b* of such bearing being secured to the top surface of previously mentioned horizontal support plate 62 by bolts such as 112 (FIG. 1). Inner portion 111*a* of bearing 111 and axle 106 are secured to each other by a set screw 120 screwed into cooperating threads provided in a hole 111*c* extending radially through portion 111*a* of bearing 111, such screw being tightened against axle 106. Axle 106 extends through a hole 62*a* provided in plate 62 and of a larger diameter than axle 106, and such axle is thereby free to rotate in such hole.

Figures 2, 3:
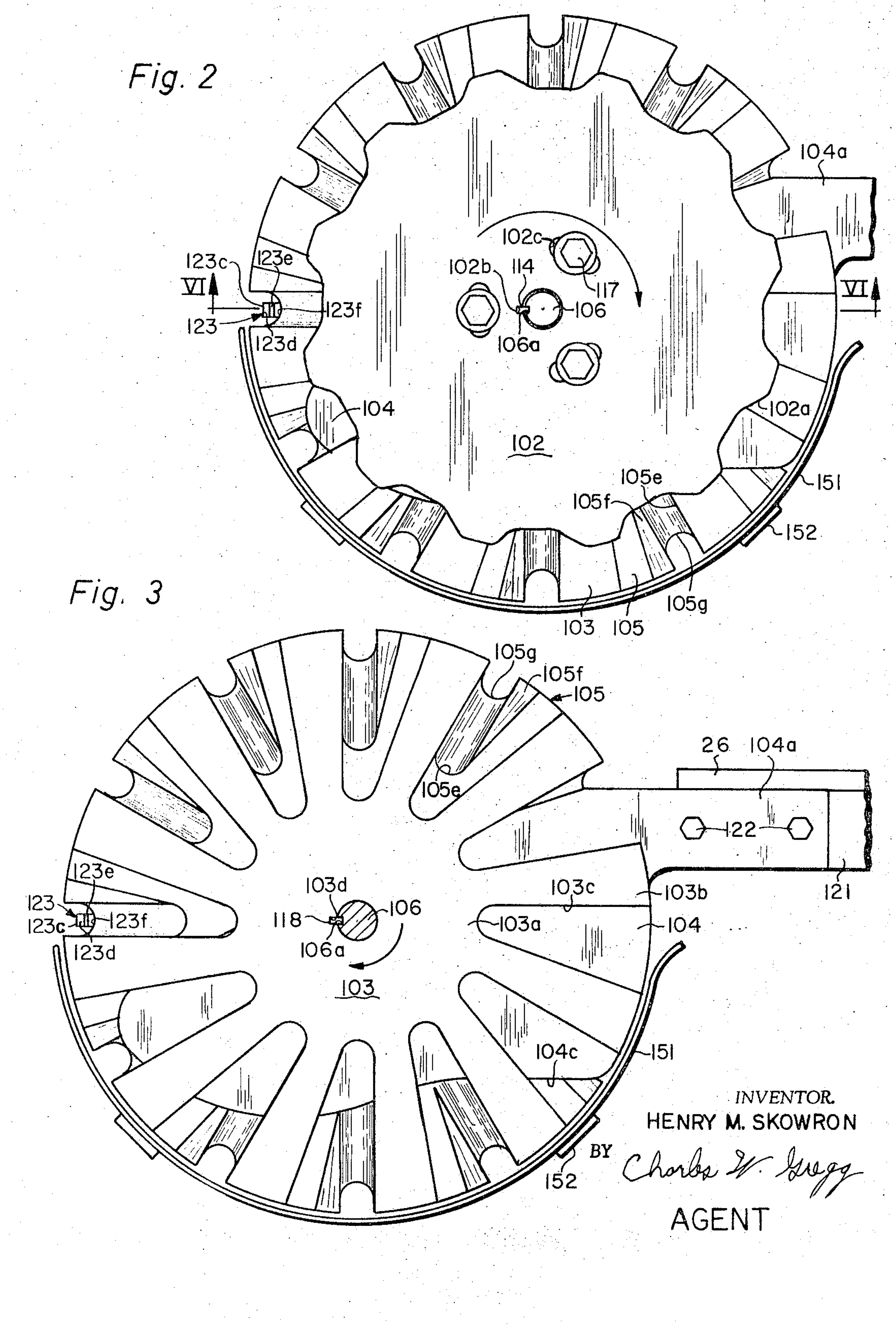

Referring further to FIGS. 1 and 6, there is shown mounted on the upper end of axle 106 a sleeve or collar 113 having a flange or rim portion 113*a*. Collar 113 is keyed to axle 106 by a key 114 inserted in a keyway 106*a* extending along the length of approximately the top third of axle 106, and also inserted in keyways 113*e* in collar 113 and 102*b* in previously mentioned cam 102 (FIGS. 2 and 6). Collar 113 is secured against vertical movement thereof along axle 106 and along key 114 by a set screw 116 which is screwed into cooperative threads provided in a hole 113*b* extending radially through collar 113 and which is tightened against key 114 (FIG. 6). Vertical movement of key 114 in keyway 106*a* is, thereby, also prevented.

There is secured to the top surface of flange portion 113*a* of collar 113 the previously mentioned cam 102 (FIGS. 1, 2 and 6) comprising a flat plate or disk having a scalloped peripheral edge 102*a* as previously discussed and as illustrated in FIG. 2. The aforementioned cam follower or roller 81 is forced against edge 102*a* of cam 102 by the tension of spring 73, also previously mentioned, and roller 81 continuously bears against said edge and follows the contours thereof during rotation of axle 106 and corresponding rotation of collar 113 and cam 102, as hereinafter further discussed. Cam 102 is secured to flange portion 113*a* of collar 113 by bolts, such as 117, extending through slotted holes, such as 102*c*, in plate 102 (FIG. 2) and screwed into cooperatively threaded holes, such as 113*d* extending downward through said flange portion (FIG. 6).

Figures 4, 5, 5A:
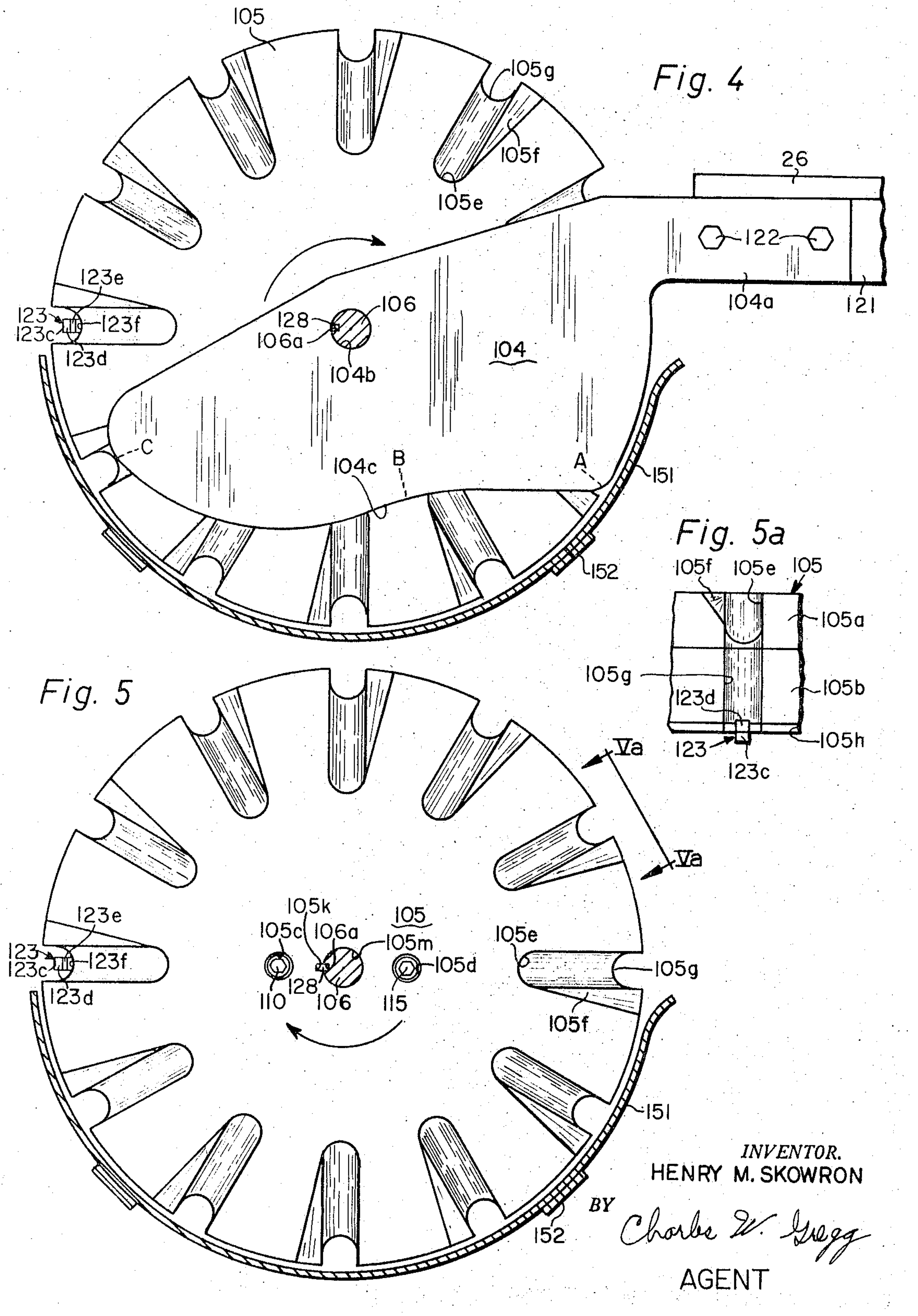

Referring again to FIGS. 1 through 6, there is shown a first rotatable drum assembly 101 (FIG. 1) comprising a vertical series or stack of associated plates, disks or wheels comprising different thicknesses and configurations and, proceeding from the top of the assembly downward, designated by the reference characters 103, 104, and 105 (FIG. 6). The planar configuration of each plate or wheel 103, 104 and 105 is best shown in FIGS. 3, 4 and 5, respectively.

Plate or wheel 103, as shown in FIG. 3, resembles a rimless wheel having a hub or nave portion 103*a* from which extends, somewhat radially, a plurality of identical rays or spokes, such as 103*b*, such spokes being evenly spaced from each other. A plurality of twelve such spokes or rays are shown extending from nave portion 103*a* and any selected point on any selected spoke is, therefore, circularly spaced 30° from corresponding points on the spokes adjacent each such selected spoke. It is to be understood, however, that plate or disk 103 could comprise a greater or lesser number of evenly spaced spokes or rays than twelve, if so desired or expedient for some reason. Spokes or rays, such as 103*b*, are horizontally longer in length than the tubings, such as 17, previously mentioned. The spaces such as 103*c* between such spokes or rays (FIG. 3) are, therefore, greater in horizontal depth than said tubings, and such spaces, in the direction from their outer towards their inner limits, taper in horizontal width. For purposes hereinafter pointed out, adjacent sidewalls of adjacent spokes horizontally and uniformly curve toward each other and meet to provide a concave semicylindrical wall defining the inner limits of the spaces such as 103*c*. The diameter of such semicylindrical wall is slightly greater than the outside diameter of tubings, such as 17, previously mentioned. Plate 103 also has a vertical depth or thickness which is somewhat greater than the outside diameter of said tubings (FIG. 6). It is apparent, therefore, that tubings, such as 17, can readily fit into the pockets or spaces, such as 103*c*, provided in plate or disk 103, as illustrated in FIG. 6.

Plate or wheel 103 is provided with a keyway 103*d* which is cooperative with keyway 106*a* in axle 106, and a key 118 is inserted in such keyways to prevent rotation of plate 103 upon axle 106 (FIGS. 3 and 6). A set screw 119 is screwed into cooperative threads provided in a hole 103*e* extending radially through wheel 103, and such screw is tightened against key 118 to prevent vertical movement of the key in keyway 106*a*, and vertical movement of disk or wheel 103 along the length of such axle and key.

As shown in FIGS. 1 through 6, there is provided a stationary tubing stand-up plate or cam 104 having a supporting extension 104*a* (FIG. 4) by which the cam is attached to a suitable bracket 121. Bracket 121 is, in turn, fastened to previously mentioned support plate 26 (FIGS. 3, 4 and 6) as by welding, for example. Extension 104*a* of cam 104 is secured to bracket 121 by bolts, such as 122, screwed into cooperating threads in suitable holes such as 121*a* (FIG. 6) provided in bracket 121. As shown in FIGS. 3 and 6, stationary cam 104 extends horizontally below plate or wheel 103 and the cam is sufficiently spaced from such wheel to allow for freedom of rotation of the wheel without interference from cam 104. Axle

106 extends through a hole 104*b* provided in cam 104 and is free to rotate therein.

As indicated by the arrows in FIGS. 2, 3, 4 and 5 of the drawings, it is intended that drum 101 rotate in a clockwise direction (viewing such drawing figures) and, therefore, tubing stand-up cam 104 need be only of a size to underlie slightly more than the front half of the horizontal expanse of wheel 103 (the lower half of such wheel when viewing FIGS. 3 and 4) since the tubings handled are only carried by the drum through an arc of travel of approximately 180°, as hereinafter discussed. The front edge 104*c* of cam 104 and between points A and C indicated on such edge in FIG. 4, that is, the lower edge of such cam when viewing FIG. 4, curves relatively abruptly inwardly away from such point A on edge 104*c* and toward an intermediate point B also indicated, in FIG. 4, on such edge. Point A is located at the maximum distance of edge 104*c* from the centers of drum 101 and axle 106, and point B is at the minimum distance of such edge from the centers of drum 101 and axle 106. From point B on edge 104*c* of cam 104, such edge curves gradually outward and toward said point C on such edge. Point C is spaced from the center of drum 101 at a distance intermediate said maximum and minimum distances. As discussed in some detail hereinafter in an operational example of the invention, edge 104*c* of cam 104 is arranged and has a configuration such as to raise tubings from a horizontal to a vertical position during rotation of drum assembly 101.

Previously mentioned plate 105 (FIGS. 5, 5*a* and 6) is shown as comprising top and bottom sections 105*a* and 105*b* (FIG. 6) respectively. However, plate 105 is made in two sections, as shown, only for convenience of fabrication of such plate. Plate 105 could, if desired, be made from a single piece of material, as is readily apparent.

Top section 105*a* of plate 105 is provided, adjacent the outer priphery thereof, with a series of radially extending and equally spaced semicylindrical channels, such as 105*e* (FIGS. 2 through 6) each of which slopes downwardly in an outward direction at an angle of approximately 30° toward a respectively associated vertical channel, such as 105*g*, in the outer periphery of plates 105*a* and 105*b*. Each such vertical channel has a substantially U-shaped horizontal cross-section configuration, as best shown in FIGS. 5 and 5*a*, and a horizontal width and depth slightly greater than the diameter of tubings such as 17. Twelve such semicylindrical and associated vertical channels are shown about the periphery of plate 105, such channels corresponding in number to the number of tubing receiving pockets or spaces such as 103*c* provided in wheel 103 with which they cooperate, as hereinafter discussed. As best illustrated in FIGS. 5 and 5*a*, the leading sidewall such as 105*f* of each channel 105*e*, that is the sidewall of each respective channel which is the leading sidewall thereof during the previously mentioned clockwise rotation of plate 105, slopes from the top of section 105*a* of plate 105 downwardly at an angle of approximately 45° toward the associated channel. Therefore, because of the previously mentioned 30° downward and outward slope of the channels such as 105*e*, each such sloped portion of each said leading sidewall, such as 105*f*, tapers in width in the direction from the outer periphery of section 105*a* of plate 105 toward the center of such plate section.

As shown in FIGS. 1 through 6, and FIGS. 17 and 18, and as best illustrated in the latter two figures, the bottom wall of section 105*b* of plate 105 is provided with a recess 105*h* which extends annularly about such plate section adjacent the outer periphery of the bottom of the plate section. There is provided in recess 105*h*, adjacent the outer periphery thereof and in radial alignment with each of the semicylindrical channels 105*e* in section 105*a* of plate 105, tubing-end detection members such as 123, there being one such member for each associated pair of channels 105*e* and 105*g* but, for purposes of simplification of the drawings, only one of the members being shown therein in FIGS. 2 through 4. Each member, such as 123, is tightly secured to that part of the bottom surface of section 105*b*, lying within bottom recess 105*h* of plate section 105*h*, by bolts such as 124 which extend through small diameter holes, such as 123*b* (FIGS. 17 and 18) in each respective member and whose threaded ends are screwed into cooperating threads provided in holes, such as 125, provided in the bottom of plate section 105*b* adjacent the center of each channel 105*g*. The heads of the bolts such as 124 are disposed in larger diameter holes, such as 123*a*, provided in each member 123.

As further shown in FIGS. 1, 6, 17 and 18, as will best be understood from viewing FIGS. 17 and 18 of the drawings, an end portion 123*c* of each member 123 extends outwardly beyond the outer periphery of recess 105*h* in plate 105 and up into the bottom of the channel, such as 105*g*, with which the respective member 123 is associated. An outer face 123*d* of end portion 123*c* of each member 123 slopes downwardly and outwardly at approximately a 45° angle with the horizontal (FIGS. 17 and 18) while an inner face 123*e* of portion 123*c* of each respective member slopes downwardly and inwardly at a similar angle. Outer and inner faces 123*d* and 123*e* of end portion 123*c* of each respective member 123 converge at approximately a 90° angle at their upper limits to form a summit on the respective end portion 123*c*, such summit being defined by the line of juncture of said faces at said upper limits thereof. The center of each such summit is disposed, within the bottom of the U-shaped channel 105*g* with which the respective member 123 is associated, at a point which is in alignment with the radial centerline of channel 105*e* associated with the respective channel 105*g* but which is substantially closer to the curved inner wall of the respective channel 105*g* than to the outer periphery of plate section 105*b*. As best illustrated in FIGS. 17 and 18, the inner face such as 123*e* of each member 123 is shorter than that of the outer face such as 123*d* of each respective member. This is occasioned by cutting away, adjacent the curved inner wall of each channel 105*g*, part of portion 123*c* of member 123 associated with each respective channel to thereby provide a rectangular notch, such as 123*f* in each said portion 123*e* (FIGS. 17 and 18).

It is pointed out at this time that, when a tubing, such as 17, is supplied, as hereinafter further discussed, to a channel 105*g* with the open end of the tubing downwardly disposed as shown in FIG. 17, the rim of the tubing enters notch 123*f* in the respective member 123 and is caught therein. The tubing at such time is thus unbalanced and its upper end will lean against the internal wall of a shield, or cover or guard plate 151, which surrounds the front half of drum assembly 101 as shown in FIGS. 1 through 5 and as hereinafter discussed. When the tubing is carried beyond the end of shield 151, as illustrated in FIG. 6 and 17, the tubing will tumble as indicated by the arrow in FIG. 17, with the then upper closed end thereof issuing first out of plate 105 of drum assembly 101. However, if as illustrated in FIG. 18, a tubing such as 17 is supplied to a channel 105*g* with the closed end of such tubing downwardly disposed, the rounded closed end of such tubing contacts the outer face 123*d* of the respective member 123, and slides thereover until it comes to rest against shield 151. When such tubing is carried beyond the end of shield 151, as illustrated in FIG. 18, the tubing will continue its sliding movement over said face 123*d* and the lower end thereof will issue first out of the bottom end of said channel 123*g* as indicated by the arrow in FIG. 18. In the light of the foregoing brief discussion, it will be readily apparent that tubings supplied to the channels such as 105*g* in plate 105 of drum 101 will, regardless of the orientation of the ends of the tubings when they are supplied to said channels, always be delivered from the channels with the closed ends of the tubings first, that is, with such ends as the leading ends of the tubings.

Referring to FIGS. 1 and 6, there is shown mounted on axle 106 below plate 105, a sleeve or collar 126 having a flange or rim portion 126*a*. Collar 126 is keyed to axle 106 by a key 128 inserted in previously mentioned keyway 106*a* in axle 106 and in a keyway 126*e* in collar 126. Similarly, plate 105 is keyed to axle 106 by key 128 which also extends through a keyway 105*k* in plate 105 adjacent the perimeter of a hole 105*m* extending through the center of plate 105 and through which axle 106 snugly extends. Collar 126 is secured against vertical movement thereof along the lengths of axle 106 and key 128 by a set screw 127 which is screwed into cooperative threads provided in a hole 126*b* extending radially through collar 126 and tightened against key 128 (FIG. 6). Vertical movement of key 128 in keyway 106*a* is, thereby, also prevented. A pair of bolts 110 and 115 (FIGS. 5 and 6) extend downwardly through vertical holes 105*c* and 105*d*, respectively, provided in plate 105, and are tightly screwed into cooperating threads provided in holes 126*d* and 126*c*, respectively, provided in flange portion 126*a* of collar 126 (FIG. 6). The upper ends of holes 105*c* and 105*d* in upper section 105*a* of plate 105 (FIG. 5) are somewhat larger in diameter than the remainder of such holes, and the heads of bolts 110 and 115 are fully disposed within such enlarged portions of said holes. It is, thus, apparent that bolts 110 and 115 maintain sections 105*a* and 105*b* of plate 105 in intimate and immovable contact with one another, and also securely fasten plate 105 to the top surface of flange portion 126*a* of collar 126.

A spur gear 131 (FIGS. 1 and 6) is provided on axle 106 above previously mentioned support plate 108 and slightly spaced therefrom. Spur gear 131 is keyed to axle 106 by a key 133 disposed in a second keyway 106*b* provided in axle 106 and in a cooperating keyway 131*b* provided in spur gear 131. A set screw 132 is screwed into cooperative threads provided in a radially extending hole 131*a* in gear 131 and is tightened against axle 106 to prevent vertical sliding movement of gear 131 upon axle 106. Thus driven rotation of spur gear 131, as hereinafter discussed, will impart similar rotation to axle 106.

The bottom end of a relatively short upright axle or stud 136 (FIGS. 1 and 6) having a flange 136*a* integral therewith, extends downwardly through a hole 108*b* provided in support plate 108 with the bottom of said flange resting against the top surface of plate 108. A lock washer 149 is disposed on axle 136 adjacent the bottom end thereof and a nut 139 is screwed onto threads provided on the bottom end of the axle, such washer thereby being disposed between said nut and the bottom surface of plate 108. Nut 139 is then tightened to immovably secure axle or stud 136 to said plate with the upper end of the axle extending vertically upward from top surface of plate 108. A washer 147 is disposed on said axle and rests on the top surface of flange 136*a* of axle 136. A spur gear 141, having a sleeve bearing 137 extending axially and snugly through the center bore of such gear, is disposed on axle 139 above washer 141 and rests thereon while snugly but rotatably surrounding such axle. A chain sprocket or sprocket wheel 142 is mounted on the top face of an upper hub portion of gear 141 and is securely fastened thereto by bolts 143 and 144 extending downwardly through holes 142*a* and 142*b*, respectively, provided in the sprocket wheel, and thence screwed tightly into cooperatively threaded holes 141*a* and 141*b*, respectively, in said upper hub portion of gear 141. Another washer 146 is disposed on axle 136 above sprocket 142 and rests on a shoulder 136*b* provided on axle 136 by a threaded upper end of such axle having a smaller diameter than the remainder of the axle. A nut 138 is screwed onto the threads on the upper end of axle 136 and tightened. The space then remaining between the lower surface of washer 146 and the upper surface of washer 147 is slightly greater than the thickness of the hub of gear 141 and, therefore, such gear and its associated sleeve bearing are free to rotate on axle 136. By such arrangement gear 141 may be rotatively driven by the movement of an endless chain 151 (FIG. 1) which extends around sprocket 142 and whose links engage the teeth of such sprocket, as hereinafter further described. Previously mentioned spur gear 131 is, in turn, rotatably driven by gear 141, and gear 131, thereby, rotatively drives axle 106 and its associated apparatus secured thereto and previously discussed.

The previously mentioned substantially semicircular guard or cover plate 151 (FIGS. 1 through 5) extends around approximately the front half (viewing FIG. 1) of the outer periphery of drum 105 and slightly spaced therefrom. Such guard plate is supported by L-shaped legs, such as 152, secured in any convenient manner, such as by welding, to previously mentioned support plate 62 and to the guard plate as illustrated in FIG. 1. Plate 152, as well as acting as a guard plate, also prevents tubings from being prematurely ejected from their respectively associated channels 105*e* and 105*g* in drum 105 during rotation of the drum and the carrying of such tubings in said channels during such rotation.

A vertical support 161 (FIG. 1) is secured in any suitable manner to previously mentioned support plate 62 at the left-hand edge thereof (viewing FIG. 1). There is mounted on support 161, in any suitable manner, two additional support plates 162 and 163 which support an electric motor 164 (FIG. 1) and an open topped trough 154 and apparatus associated therewith, respectively (FIGS. 1, 12 and 20). Trough 154 comprises two side sections 154*a* and 154*b*, the bottoms of which are separated by spacers, such as 156 (FIG. 20) and which are secured to said spacers, and thereby to each other, by bolts such as 157 extending through holes provided in said spacers and through said sides adjacent the bottom edges thereof. Said bolts also extend through holes provided adjacent the top edge of support 163. Nuts, such as 158, are screwed onto said bolts and tightened to clamp sides 154*a* and 154*b* to said spacers and to support 163 with such sides being spaced from each other (FIGS. 12 and 20). A pair of pulleys 166 and 167 (FIG. 1) are rotatively mounted on support 163 in any suitable manner and a conveyor belt 153 is looped around such pulleys and a pulley (not shown) mounted on the output shaft of previously mentioned motor 164. As shown in FIGS. 12 and 20 conveyor belt 153 extends longitudinally through the space provided between sides 154*a* and 154*b* of trough 154. Thus, belt 153 is arranged to convey tubings supplied to the belt from previously mentioned drum 101, as hereinafter further discussed, to a second rotating drum 181 discussed hereinafter.

Motor 164, previously mentioned, is face mounted on support 162 and may, for example, be a variable speed direct current motor similar to motor 27 previously described. In order to provide control of the rate of speed of motor 164, a motor speed control 172 (FIG. 1) is provided and is mounted, as by suitable mounting brackets not shown, to support plate 161. Two wires or electrical leads 173 and 174 connect motor speed control 172 with motor 164. Speed control 172 has an adjustable dial 176 by which the rate of speed of motor 164 can be manually controlled in a manner similar to that previously discussed in conjunction with speed control 34 and motor 27. Speed control 172 may, for example, be a Ratiotrol® speed control similar to speed control 34 previously discussed. As discussed below the speed of motor 164 and, thereby, the speed of movement of conveyor belt 153 through the bottom of trough 154 and in a left hand direction (viewing FIG. 1) through such trough, may be manually adjusted by manual manipulation of the aforesaid adjustable dial 176 of speed control 172. Control 172 is connected to a suitable source of alternating electrical current (not shown in the drawings for purposes of simplification thereof) and, after rectification of such current by control 172, supplies direct current to motor 164 in accordance with said manual adjustment of dial 176 of control 172. The speed of motor 164 may, therefore, be controlled by manual adjustment of dial 176.

As illustrated in FIG. 1, there is disposed, beyond and generally below the exit ends of previously mentioned trough 154 and conveyor belt 153, a second rotatable drum 181 which receives tubings, such as 17, being conveyed through trough 154 and issued therefrom at said exit end thereof. As best illustrated in FIGS. 7 through 11, drum 181 is, for the most part, similar in construction to drum 101 previously discussed and, therefore, drum 181 will be discussed in detail hereinafter only to the extent necessary for an understanding of its structure and necessary to make the specification complete.

There is shown in FIGS. 1 and 11 a vertically disposed axle 201 whose bottom end is securely supported in the inner portion 203*b* of a bearing 203 by a set screw 204 (FIG. 11) screwed into cooperating threads provided in a radially extending hole 203*a* provided in inner portion 203*b* of bearing 203. The internal end of screw 204 is screwed tightly against axle 201 and, thereby, vertical or rotational movement of axle 201 within inner bearing portion 203*b* is prevented. Outer portion 203*c* of bearing 203 is secured, as by welding, to a bottom horizontal arm 202*a* of a C-shaped support 202 which is, in turn, similarly secured to previously mentioned floor or platform 16.

There is disposed on axle 201, approximately one quarter up along the length of the axle from the bottom end thereof, a spur gear wheel 206 provided with gear teeth such as 206*a* (FIGS. 1, 11 and 19). The center of gear wheel 206 is provided with a hole 206*b* through which axle 201 extends and is closely surrounded by gear 206 (FIG. 19). Adjacent the perimeter of hole 206*b* a keyway 206*c* is provided in gear 206, and a key 207 is disposed therein and in a cooperative keyway 201*a* provided in axle 201. Rotational movement of gear 206 upon axle 201 (FIGS. 1 and 11) is thereby prevented. Vertical movement of gear 206 upon axle 201 is prevented by set screw collars 208 and 209 surrounding axle 201 below and above gear 206, respectively, and secured to such axle by set screws 211 and 212 which are screwed into threads provided in holes 208*a* and 209*a* in collars 208 and 209, respectively. Such set screws are then tightened against axle 201. The purpose of gear wheel 206 will be discussed hereinafter in the description.

Upward approximately one half the distance along the length of axle 201 there is provided a chain sprocket or sprocket wheel 216 having teeth 216*a* which cooperate with the links of previously mentioned chain 142 (FIG. 1). Sprocket wheel 216 is keyed to axle 201 by a key 217 inserted into a keyway 216*b* provided in the sprocket wheel, and also inserted into previously mentioned keyway 201*a* in axle 201 (FIG. 11). Rotational movement of sprocket wheel 216 upon axle 201 is, thereby, prevented. Vertical movement of sprocket 216 upon axle 201, and of key 217 in keyway 201*a*, is prevented by a set screw 218 screwed into cooperating threads provided in a hole 216*c* extending radially through sprocket 216. Set screw 218 is tightened against key 217 which in turn presses tightly, within keyway 201*a*, against axle 201, and secures key 217 and sprocket 216 to such axle (FIG. 11).

Figure 10:
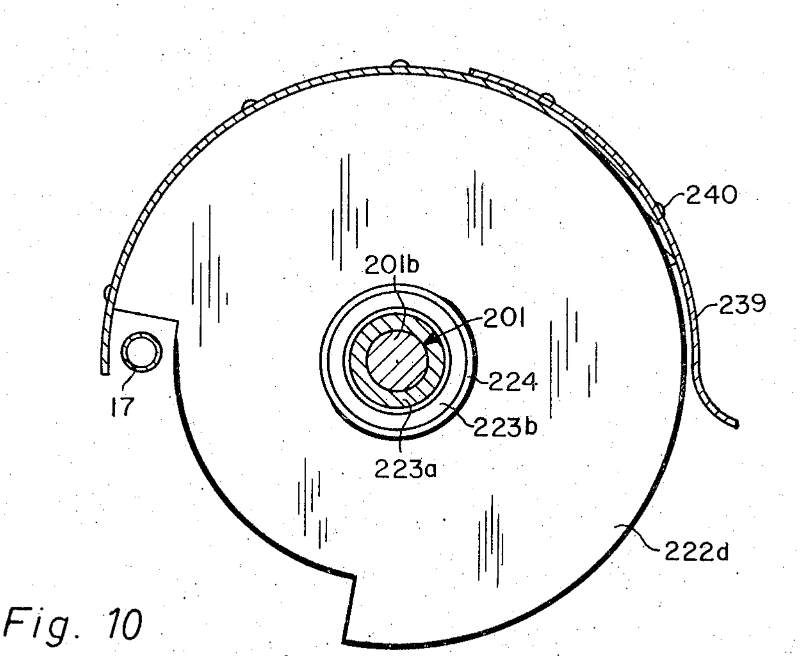

There is mounted upon the top surface of a horizontally extending top arm 202*b* of previously mentioned C-shaped support 202 (FIGS. 1 and 11) a horizontally disposed support 221. Axle 201 extends through a hole 221*a* provided in support 221 and of a somewhat larger diameter than such axle. Axle 201 is, therefore, free to rotate within hole 221*a* and support 221. There is secured to the top surface of support 221 a support member 222 (FIG. 11) comprising a cylindrical columnar portion 222*a* having a hollow 222*b* extending vertically therethrough and of a sufficient diameter that a roller bearing assembly 223 may be contained in such hollow at the upper end thereof. An enlarged portion 210*b* of axle 201 extends through an inner portion 223*a* of bearing assembly 223, such portion 301*b* being of a slightly larger diameter than the remainder of the axle. The lower end of columnar portion 222*a* of member 222 is provided with a flange portion 222*c* which rests on the top surface of support 21. Flange portion 222*c* may be secured to the top surface of support 221 and support 221 may be secured to the top surface of arm 202*b* of support 202 by welding, for example. The upper end of columnar portion 222*a* of member 222 is provided with large flange portion 222*d* having a top planar configuration as shown in FIG. 10 of the drawings. Flange portion 222*d* will be discussed in more detail hereinafter.

Outer portion 223*b* of above mentioned bearing 223 is press fitted into the top end of hollow 222*b* of columnar portion 222*a* of member 222 to a distance limited by a snap ring 224 surrounding the outer perimeter of said outer portion 223*b*. A radially extending hole 223*c* extends through inner portion 223*a* of bearing 223 (FIG. 11) and a set screw 226 is screwed into cooperating threads provided in said hole and is tightened against enlarged portion 201*b* of axle 201. Bearing 223 thus provides vertical support for axle 201 while such axle and portion 223*a* of the bearing are rotatable within outer portion 223*b* of the bearing.

Figure 8:
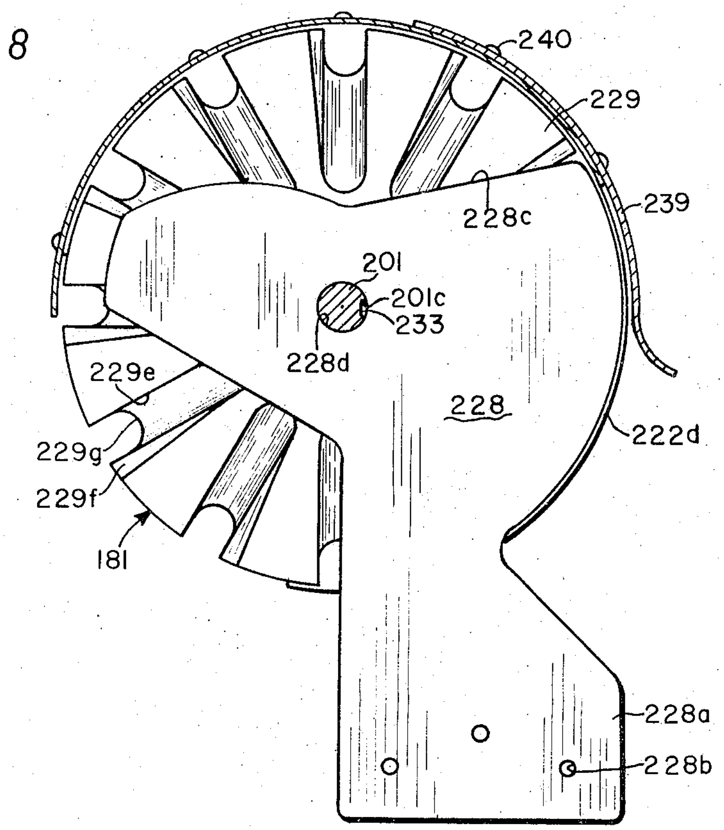
FIGS. 8, 9 and 10 are sectional plan views of parts of the apparatus of FIG. 1 taken substantially along lines VIII—VIII, IX—IX and X—X, respectively, of FIG. 1.

Referring now to FIGS. 7, 8 and 9 taken in conjunction with FIGS. 1 and 11, previously mentioned rotatable drum assembly 181 will be discussed.

Drum assembly 181 comprises a vertical series or stack of associated plates, disks or wheels comprising different thicknesses and configurations. Proceeding from the top of assembly 181, such wheels or disks are designated 227, 228 and 229, respectively, the planar configuration of each disk or wheel 227, 228 and 229 being best shown in FIGS. 7, 8 and 9, respectively.

Plate, disk or wheel 227 (FIG. 7) is similar to disk or wheel 103 of drum assembly 101 previously discussed and includes a plurality of identical rays or spokes, such as 227*b*, extending somewhat radially from a nave or hub portion 227*a* (FIG. 11) of wheel 227 and evenly spaced from each other. Twelve such spokes or rays are shown extending from nave portion 227*a* of wheel 227 and, therefore, any selected point on any selected spoke is circularly spaced 30° from corresponding points on the spokes adjacent each such selected spoke. However, as with previously discussed wheel 103, wheel 227 could comprise a greater or lesser number of spokes than twelve if found expedient to do so. Since, as previously mentioned, wheel 227 has a configuration substantially similar to wheel 103 previously discussed, no details of the shapes of the spaces between the spokes, such as 227*b*, of wheel 227 is believed necessary. It is pointed out, however, that it is intended that drum assembly 181 be rotated (as indicated by the arrows in FIGS. 7 and 9) in a direction opposite to that in which drum assembly 101 is rotated and therefore spokes 227*b* of wheel 227 slant in their radial direction, oppositely to the spokes of wheel 103 of assembly 101.

Wheel 227 is provided with a keyway 227*c* which is cooperative with a keyway 201*c* provided in axle 201 (FIGS. 7 and 11) and a key 231 is inserted in such keyways to prevent rotation of wheel 227 upon axle 201. A set screw 232 is screwed into cooperative threads provided in a hole 227*d* extending radially through wheel 227 and such screw is tightened against key 231 to prevent vertical movement of the key in keyway 201*c* in axle 201 and vertical movement of wheel 227 vertically along the length of such axle and key.

There is provided below and slightly spaced from the bottom of wheel 227 the previously mentioned plate 228 (FIG. 8) which is a stand-up cam for drum assembly 181. Such plate or cam does not rotate along with the remainder of drum assembly 181 but is held stationary similarly to cam 104 of drum assembly 101 previously discussed. Plate or cam 228 includes an extension 228*a* which is secured to the top arm of a C-shaped support bracket 232 (FIG. 1) whose bottom arm is secured to the top surface of previously mentioned support 221. Extension 228*a* may, for example, be secured to the top surface of the top arm of bracket 232 by rivets extending through holes such as 228*b* in such extension and through corresponding holes provided in the top arm of bracket 232. Support bracket 232 may, in turn, be secured to the top surface of support 221 as by welding, for example.

It is pointed out that stand-up cam 228 has a planar configuration (FIG. 8) similar to cam 104 of drum assembly 101 but since, as previously mentioned, it is intended that drum assembly 281 rotated in the direction opposite to that of drum assembly 101, stand-up edge 228*c* of cam 228 is provided on the back side of the cam (viewing FIGS. 1 and 11) that is, the upper side of the cam when viewing FIG. 8. However, it will be readily understood that edge 228*c* of cam 228 operates, similar to edge 104*c* of cam 104, to raise tubings from a horizontal to a vertical position during rotation of drum asesmbly 181. This will be discussed further hereinafter in an operational example of the invention. It is also pointed out that cam 228 includes a hole or orifice 228*d* (FIG. 8) which extends vertically through the cam and through which axle 201 snugly but rotatably extends. Axle 201 is thus free to rotate within hole 228*d* in cam 228.

Previously mentioned plate 229 (FIGS. 1, 11, 7, 8 and 9) is shown as comprising top and bottom sections 229*a* and 229*b* (FIG. 11) respectively. Plate 229, similarly to plate 105 previously discussed, is made in two sections for convenience of fabrication of such plate. Plate 229 could, if desired, be made from a single piece of material rather than two as illustrated. Top section 229*a* of plate 229 is provided, adjacent the outer periphery thereof, with a series of radially extending and equally spaced semicylindrical channels, such as 229*e* (FIGS. 7, 8, 9 and 11) each of which slopes downwardly and outwardly at an angle of approximately 30° toward a respectively associated vertical channel, such as 229*g* in the outer periphery of plates 229*a* and 229*b*. Each such vertical channel has a substantially U-shaped horizontal cross-sectional configuration as best shown in FIG. 9 and similar to configuration of channel 105*g* illustrated in FIG. 5*a* of the drawings. Each channel, such as 229*g*, has a horizontal width and depth slightly greater than the diameter of tubings such as 17. Twelve channels such as 229*e* and their respectively associated vertical channels 229*g* are shown about the periphery of plate 229, such channels corresponding in number to the number of tubing receiving pockets or spaces provided between the spokes 227*b* of wheel 227 previously discussed and with which said channels cooperate, as hereinafter further discussed.

The leading sidewall such as 229*f* (FIG. 9) of each channel 229*e*, that is, the sidewall of each respective channel which is the leading sidewall thereof during rotation of plate 229 in a counterclockwise direction (viewing FIGS. 7, 8 and 9) slopes from the top of section 229*a* of plate 229 downwardly at an angle of approximately 45° toward the associated channel. Therefore, similarly to the sloped portion of each leading sidewall 105*f* of plate 105 as illustrated in FIG. 5*a*, each said sloped portion of each said leading sidewall 229*f* of plate 229, because of the previously mentioned 30° downward and outward slope of the channels such as 229*e*, tapers in width in the direction from the outer periphery of section 229*a* of plate 229 toward the center of such plate section.

Referring further to FIGS. 9 and 11, the upper end of axle 201, above the enlarged portion 201*b* thereof, extends snugly through a circular hole 229*h* provided in the center of plate 229. A keyway 229*k* is provided in plate 229 adjacent the edge of hole 229*h* and in cooperative relationship with previously mentioned keyway 201*c* in axle 201, and a key 233 is inserted in said keyway to lock plate 229 against rotational movement upon axle 201. A shoulder portion 201*d* (FIG. 11) is formed on axle 201 by the juncture of the enlarged portion 201*b* of such axle and the smaller diameter upper end of the axle above portion 201*b*. A circular plate 234 surrounds axle 201, and rests on shoulder 201*d* of such axle and the upper surface of inner portion 223*a* of bearing 223 while being disposed in a circular recess 229*m* provided in the bottom center of plate 229. A pair of bolts 236 and 237 (FIGS. 9 and 11) extend downwardly through vertical holes 229*c* and 229*d*, respectively, provided in plate 229, and tightly screwed into cooperating threads in holes 234*a* and 234*b*, respectively, provided in above mentioned circular plate 234. The upper ends of holes 229*c* and 229*d* in upper section 229*a* of plate 229 are somewhat larger in diameter than the remainder of such holes and the heads of bolts 236 and 237 are fully disposed within such enlarged portions of such holes. It is thus apparent that bolts 236 and 237 maintain sections 229*a* and 229*b* of plate 229, and plate 234, in intimate and immovable contact with one another.

A shield or guard plate 239 (FIGS. 1, and 7 through 11) closely surrounds drum assembly 181 at the rear of such assembly (viewing FIG. 11) and is secured in a spaced relationship from the rotatable parts of such drum by being riveted at its bottom edge by rivets, such as 240, inserted into suitable holes provided in the peripheral edge of previously mentioned upper flange 222*d* of member 222. Guard plate 239 in addition to acting as a shield for the rear of the drum assembly 181 acts as a guard plate to prevent tubings, such as 17, which are supplied to wheel 227 of such drum assembly from being prematurely ejected from the assembly by centrifugal force supplied to such tubings by the rotation of the assembly as hereinafter discussed.

Referring further to FIGS. 10 and 11 of the drawings, it will be noted that flange 222*d* of support member 222 has a diameter slightly greater than the rotative portions of drum assembly 181. Thus, when shield 239 is attached to flange 222*d* as discussed above, the mentioned spaced relationship between the shield and said rotative portions is established. It will be noted in reference to FIG. 10 that the radius of flange 222*d* is the same for a distance of approximately three quarters of the periphery of the flange but the other quarter or remainder of such periphery has a reduced radius. Such reduction in radius is slightly greater than the diameter of tubings, such as 17, supplied to drum assembly 181 (FIG. 11). The zone of the quarter periphery of flange 222*d* of reduced radius (viewing FIG. 10) comprises substantially the third quadrant of the flange, that is, substantially the forward left hand quadrant of the flange when viewing FIGS. 1 and 11. The exact orientation of the zone of reduced radius is best understood by referring to FIG. 10 of the drawings. The purpose of said zone of reduced radius provided on flange 222*d* will be made more apparent hereinafter in an operational example of the invention.

On the left hand side of FIG. 1 there is shown, at a loading station, a tubing supporting chuck 241 receiving from drum assembly 181 a tubing, such as 17. A series of chucks such as 241 are illustrated by dashed lines in FIG. 7 of the drawings. Chucks such as 241 are carried on a revolving turret 242 adjacent the outer periphery of such turret (FIGS. 1 and 7). Such chucks are each intended to receive at said loading station and carry therefrom a tubing, such as 17, upon which operations are to be performed at a station or stations located, subsequent to said loading station, in the path of rotation of turret 242. Below turret 242 (FIG. 1) there is shown a pair of spaced apart pulleys, such at 243 and 244 carried on a shaft, such as 246, which also carries on its upper end one of the chucks, such as 241. A plurality of shafts such at 246 and associated pulleys such as 244 are illustrated in the view of FIG. 19. As illustrated in FIG. 1, taken in conjunction with FIG. 19, the teeth, such as 206*a* of gear wheel 206, are intended to enter the space between each pair of pulleys, such as 243 and 244 (FIG. 1) and also to extend between adjacent shafts, such as 246, on turret 242 (FIG. 19). By such arrangement it will be readily recognized that rotation of turret 242 will cause corresponding rotation of gear wheel 206 but in the opposite direction, the shafts, such as 246 carried by said turret, acting, at such time, as gear teeth which mesh with those, such as 206*a* of gear wheel 206.

The aforementioned and briefly described apparatus such as chucks 241, turret 242, pulleys 243 and 244, and shafts 246 form, per se, no part of the present invention but are parts of another machine with which the apparatus of the present invention can be conveniently employed. Such parts are, therefore, shown and discussed only to the extent necessary for the purpose of giving one specific example of a machine with which the apparatus of the present invention may be usefully employed.

There is, for example, shown and discussed in copending application for Letters Patent of the United States, Ser. No. 417,590, filed Dec. 11, 1964 by Elmer L. Anderson and assigned to the same assignee as the present application, a machine for performing operations on tubings each having one rounded closed end. One such tubing is supplied to each of a succession of chucks carried by said machine through a predetermined path of travel for said operations to be performed on said tubings. If more details of a type of a machine with which the apparatus of the present invention may be usefully employed are desired, reference is made to the aforesaid copending patent application. In connection therewith, it is pointed out that above mentioned chucks 241, turret 242, pulleys 243 and 244, and shafts 246 correspond, respectively, to chucks 12, turret 11, pulleys 51 and 52, and shafts 47 shown and discussed in said copending application.

Having thus far discussed in detail the arrangement and structure of the apparatus of the present invention, a brief operational example thereof will now be given.

Assuming, with reference to FIG. 1 of the present application, that the apparatus of the invention is being employed with a machine such as shown and discussed in the previously cited copending application, and turret 242 of such machine is continuously rotating in a clockwise direction to successively present each of a succession of chucks such as 241 to a loading station for receipt therein of a tubing such as 17, then gear wheel 206 and, thereby, axle 201 are being continuously rotatively, driven in a counterclockwise direction. Accordingly drum assembly 181 is continuously rotatively driven in a corresponding direction, as further mentioned hereinafter. Chain 142 is driven by sprocket 216 on axle 201 in a direction to cause counterclockwise rotation of gear 141 and, thereby, clockwise rotation of spur gear 131, axle 106, and the associated drum assembly 101 and cam 102. It will be further assumed that conveyor belt 11 of hopper 12 is operating to supply a continuous collinear and end-to-end succession of longitudinally aligned lengths of pipe or tubings, such as 17, to the entrance end 18*a* of channel 18*b* in chute 18. Tubings, such as 17, each have one closed end, as previously mentioned, and, insofar as the closed or open ends of the tubings are concerned, said continuous succession of tubings are randomly oriented in relation to each other. That is to say, a closed or open end of any randomly selected tubing of said succession of tubings may abut a closed or open end of the tubing immediately preceding such selected tubing, or the closed or open end of the tubing immediately following such selected tubing.

It is further assumed that motors 27 and 164 are energized through their respective speed controls 34 and 172 and, therefore, conveyor belts 19 and 153 are moving at speeds selected by the manual adjustment of dials 35 and 176 of the respective controls. For the present, such speeds will be assumed to be correctly selected for proper operation of the apparatus. Adjustment of such speeds will be mentioned further hereinafter.

During rotation of axle 106 and, thereby, cam 102, cam follower 81, associated with gating device 42, is periodically actuated by following the contour of scalloped edge 102*a* of cam 102 against the biasing force of spring 73. Cam follower 81, in turn, actuates device 42 to raise its forward end and thereby release the tubing, such as 17, then being held by tubing stop 42*c*. Such tubing is, thereby, permitted to be carried by conveyor belt 19 through chute 18. At the same time contactor 43 on the opposite end of device 42 is lowered and, before the preceding tubing is released, tubing contacting member 52 pressed downward against the sidewall of the next succeeding tubing and prevents belt 19 from moving such tubing. Thereafter, following further rotation of cam 102, cam follower 81 returns to its original position under the biasing force of spring 73, gating device 42 lowers and raises its forward and rear ends, respectively, and said succeeding tubing is released. That tubing and the then next succeeding tubing is moved by belt 19 through chute 18 until the leading end of the then preceding tubing contacts member 42*c* and further movement of tubings into or through chute 18 is, thereby, temporarily interrupted.

It is pointed out that the peripheral edge 102*a* of cam 102 is arranged and the speed of belt 19 is adjusted so that gating device 42 is actuated to release each leading tubing of said succession of tubings in a time relationship such that belt 19 will carry each released tubing to drum assembly 101 substantially at the same time that one of the spaces 103*c* between adjacent spokes 103*b* of wheel 103 of such drum assembly arrives at the exit end of chute 18 and is so disposed as to conveniently receive therein the tubing then being delivered thereto. Synchronization between the arrival of each of said spaces in wheel 103 of assembly 101 at its proper position for receipt of a tubing from chute 18 and the delivery of such tubing to such properly positioned space can be regulated by manually adjusting speed control 34 and, thereby, the speed of motor 27 and belt 19. It is also pointed out that it may be, and probably will be, necessary that such a manual adjustment of speed control 34 be made whenever the speed of the machine which finally receives the tubings and controls the speed of drum assemblies 181 and 101 through a gear wheel, such as 206, is changed.

As described above, gating device 42 is successively actuating in synchronization with the speed of rotation of drum assembly 101 so that each succeeding tubing, such as 17, of a continuous succession of tubings supplied to chute 18 from hopper 12, is delivered to each succeeding space or pocket 103*c* in wheel 103 of assembly 101 as each such space is presented to the end of chute 18 during rotation of such assembly. The operation of drum assembly 101 in handling a single tubing, such as 17, will now be described, it being readily understood that each successive tubing of a succession of such tubings is handled in a manner similar to that now described.

A tubing, such as 17, ejected or supplied from the exit end 18*c* of chute 18 (FIG. 1) is delivered into one of the pockets, such as 103*c* (FIG. 6) in wheel 103 of rotating drum assembly 101, such tubing then resting on stationary stand-up cam 104 disposed below wheel 103. The spoke of wheel 103 (FIGS. 3 and 6) at the rear of said pocket during clockwise rotation of drum assembly 101, pushes the tubing in a semicircular arc of travel extending in a clockwise direction over the top surface of stand-up cam 104. Referring specifically to FIGS. 3 and 4, while said tubing is moved through said arc of travel, the end of the tubing adjacent the outer periphery of wheel 103 is first moved past point A of edge 104*c* (FIG. 4) on cam 104 and is then moved toward point B on said edge. Prior to the arrival of said tubing at said point B, such tubing becomes overbalanced at its outer end and the tubing pivots about edge 104*c*. Said outer end of the tubing then drops into the channel 105*e* in upper section 105*a* of plate 105 which is associated with the pocket or space in wheel 103 in which the tubing is disposed. The outer end of the tubing then slides or rolls down the sloping leading sidewall 105*f* of said channel, if it does not drop directly into such channel. As drum assembly 101 continues its rotation, the inner end of the tubing is moved further toward point B on edge 104*c* of cam 104, and then past point B and toward point C on such edge. During the movement of the tubing from said point B toward said point C, edge 104*c* of cam 104 gradually and continuously raises said inner end of the tubing until the tubing reaches a substantially vertical position and drops into the vertical channel 105*g* in lover section 105*b* of plate 105, such channel being associated with the aforesaid channel 105*e* in which the tubing was disposed. The lower end of the tubing then comes to rest against the respective tubing-end detection member 123 disposed at the bottom of the vertical channel 105*g* in which the tubing dropped and shield 151, as previously discussed, temporarily prevents the issuance of the tubing from said channel. When, however, as also previously discussed and as illustrated in FIGS. 17 and 18, the tubing is carried beyond the end of shield 151 (FIGS. 2 through 5) the tubing will tumble, upper end first, or slide, bottom end first, out of said channel depending on whether the closed or open end, respectively, of the tubing is the then lower end.

Each of a continuous succession of tubings, such as 17, issued or ejected from rotating drum assembly 101 in the manner described above, are successively delivered to conveyor belt 153 in trough 154 (FIG. 1) which carries each tubing to rotating drum assembly 181. The speed of belt 153 is adjusted in a time relationship with the speed of rotation of drum assembly 101 so that a pocket or space between the spokes, such as spokes 227*b* of wheel 227 of assembly 181, is disposed at the exit end of trough 154 each time a tubing issues or is ejected from such end of the trough. Thus, successive tubings issued from trough 154 are delivered to succeeding ones of said spaces or pockets in wheel 227 during rotation of drum assembly 181.

Drum assembly 181 operates in a manner identical to that described in conjunction with drum assembly 101 in raising tubings from a horizontal position to a vertical position except, as previously mentioned, drum assembly 181 rotates in a counterclockwise direction which is opposite to the direction of rotation described for assembly 101. It is pointed out, however, that the direction of rotation for which either of the drum assemblies is arranged is purely a matter of choice.

When drum assembly 181 completes the raising of a tubing to its vertical position, such tubing drops downwardly in its associated vertical channel, such as channel 229*g* in lower section 229*b* of plate 229 of assembly 181. The lower end of the tubing thereby contacts the top surface of flange 222*d* of support member 222 (FIGS. 10 and 11) and is moved along on said surface until it reaches approximately the position illustrated by tubing 17 in FIG. 10, that is, until the lower end of the tubing moves off of the top surface of flange 222*d*. At such time the tubing is free to drop further vertically and be delivered to a mandrel or chuck on a machine which is to perform operations on the tubing, such as, for example, a chuck 241 carried on a rotating turret 242 as previously mentioned and illustrated in FIGS. 1, 7 and 19 of the drawings. As previously discussed, and as an example only, drum assembly 181 is rotatively driven in sychronism with turret 242 to deliver each successive tubing, carried by drum assembly 181, to the succeeding chucks being carried successively, by said turret, through a circular path of travel.

It is pointed out that the gear wheel such as 206 on axle 201, sprocket 216 on such axle, sprocket 142 and cam 102 on axle 136, and chain 142 are selected or arranged in accordance with the number of tubing receiving pockets provided in drum assemblies 101 and 181, and in accordance with the spacing of the workpiece or tubing supports on a machine to which the tubings are finally supplied and with the speed of such machine. Said selection or arrangement of said parts is necessary so that synchronization of the apparatus may be attained and a tubing thereby supplied to each workpiece support as each such support arrives at or passes the previously mentioned loading station. It is further pointed out that the apparatus of the present invention may be employed in conjunction with a machine which is periodically indexed to intermittently present each of a succession of workpiece supports to a loading station where each such support dwells for a brief period of time, as well as in conjunction with a machine which is moving continuously and, thereby, moves workpiece supports past a loading station without a dwell period of such supports at such station.

It is also pointed out that, although the apparatus of the present invention is shown and described as orienting a succession of tubings, each having one rounded closed end, so that each tubing is delivered from the apparatus in a vertical direction and with its open end first or leading, such apparatus can be readily rearranged or minor modifications made thereto so that each of a continuous succession of tubings, each having one rounded or similarly tapered end, may be delivered from the apparatus in a vertical direction and with its tapered end first or leading; or in a horizontal direction with either the open end or the tapered end of each of the tubings first or leading. For example, the tubings carried by conveyor belt 153 (FIG. 1) issue therefrom in substantially a horizontal direction and with their tapered ends leading. Such tubings could be delivered directly from said belt to a machine or apparatus which requires horizontal and tapered-end-first orientation of the tubings when delivered thereto. As another example, the tubings issuing from conveyor belt 153 of the present invention could be delivered directly from said belt to another conveyor belt moving in the direction opposite to belt 153 and the tubings issuing from such other belt world issue therefrom in a substantially horizontal direction and with their open ends leading. Such tubings could be delivered to a drum assembly, such as assembly 181 of the present invention, in a manner similar to that described herein for delivery of tubings to assembly 181, and the tubings would then issue from said drum assembly in a vertical direction and with their tapered ends leading. In other words, when each tubing of a linear succession of tubings, such as that handled by the apparatus of the present invention as disclosed herein, has been oriented so that the rounded or similarly tapered ends of all such tubings are the leading ends thereof in the path of movement of the tubings, all such tubings can be readily delivered to another machine or apparatus with the same preselected direction and orientation for all the tubings.

Although there is herein shown and described only one from of apparatus embodying the invention, it is to be understood that various changes and modifications may be made therein within the scope of the appended claims without departing from the spirit and scope of the invention.

What is claimed is:

1. In conjunction with a plurality of tubings each having one rounded or similarly tapered end, apparatus for individually receiving said tubings and issuing each such tubing from the apparatus in a tapered-end-first orientation regardless of the end-first orientation of the respective tubing when received by the apparatus, such apparatus comprising, (A) a vertical open-sided tubing receiving channel having a U-shaped horizontal cross-sectional configuration, (B) means for individually and vertically supplying said tubings to said channel, (C) a tubing-end detection device projecting into said channel from the innermost wall of the channel toward the open side thereof, such device being substantially narrower in width than the width of the channel and having an outer face sloping upwardly toward said innermost wall and an inner face sloping upwardly toward said open side of said channel, such faces thereby converging at a line of juncture to provide an apex which is positioned, toward said innermost wall, off-center of the circular part of said channel, whereby the lower ends of tubings, delivered to said channel tapered end first, slide over the outer face of the detection device to issue from the lower end of the channel tapered end first, and the rims of the lower ends of tubings, delivered to said channel open end first, slide over the inner face of the detection device and are hung up on such device to cause the upper tapered ends of the tubings to tumble out of the upper end of said channel and to thereby issue therefrom tapered end first.

2. In conjunction with a continuous collinear succession of tubings each having one rounded or similarly tapered end and a random end-to-end orientation relative to each other, apparatus for successively positioning each tubing of said succession so that all of the tubings issue from such apparatus with similar ends of the tubings issuing first therefrom, such apparatus comprising, in combination;

(A) tubing conveyor means successively receiving each tubing of said succession and having tubing entrance and exit ends;

(B) a vertically extending rotative axle supporting a rotatable drum assembly disposed at the tubing exit end of said conveyor means, such assembly comprising a vertical stack of components including;

(a) a rotatable horizontally disposed and rimless spoked wheel having a series of tubing receiving and conveying horizontal pockets provided between the spokes of the wheel and evenly spaced about the upper part of said assembly;

(b) a rotatable and horizontally disposed disk below said wheel and separated therefrom to provide a space therebetween, such disk including about the outer periphery thereof a series of vertical open-sided tubing conveying channels, one such channel being disposed below and associated with each said pocket provided in said wheel and each having a substantially U-shaped horizontal cross-sectional configuration;

(c) a stationary horizontally disposed plate provided in said space and surrounding said axle, such plate providing a floor for said pockets and having a gradually recessed planar configuration such as to raise tubing provided to said pockets from a horizontal to a vertical position during rotation of said wheel and disk and cause each such raised tubing to drop into the vertical channel in said disk associated with the pocket in which the respective raised tubing is carried; and (d) a tubing-end detection device at the bottom of each of said vertical channels, such devices being arranged to be contacted by the lower end of tubings dropped into the channels associated with the respective devices and causing each such tubing to issue from the open side of the respectively associated channel with the lower or upper end of the tubing as the leading end thereof accordingly as the respective detection device is contacted by the tapered or open end respectively of such tubing;

(C) gating means normally preventing conveyance by said conveying means of said tubings and, when actuated, permitting only such conveyance of the then next succeeding tubing of said succession of tubings;

(D) means for rotating said axle and, thereby, said drum assembly at a speed selected in accordance with the speed of movement of apparatus receiving said tubings; and (E) means including a rotatable cam connected with said axle in a rotatably driven relationship therewith, and an associated cam follower arranged to be periodically actuated by said cam during rotation thereof and connected to said gating means for corresponding periodic actuation of the gating means, such cam having a configuration such as to cause periodic actuation of said gating means in a time relationship with the speed of rotation of said drum assembly such that each succeeding one of said succession of tubings arrives at said exit end of said conveyor means simultaneously with the arrival of such exit end of the conveyor means of each successive tubing receiving pocket presented to such exit end during the rotation of the drum assembly.

3. Apparatus in accordance with claim 2 and in which each said tubing-end detection device comprises a member secured to said disk and having a portion which projects laterally and radially into the respectively associated vertical tubing conveying U-shaped channel from the innermost wall of such channel toward the open side thereof, such portion of the detection member being substantially narrower in width than the width of said channel and having outer and inner faces sloping upwardly toward each other and converging to form an apex which is positioned off-center of the circular part of said channel toward said innermost wall thereof whereby, when said tubings drop in said channel tapered-end first, such ends of the tubings slide downwardly and outwardly along the outer face of said portion of said member and the tubings are issued from said channel with the lower tapered ends thereof leading, and, when said tubings drop in said channel open-end first, the inner edges of the rims of such tubings slide downwardly and inwardly along the inner face of said portion of said member and are caught thereon, such tubings thereby becoming overbalanced on their sides facing the open side of such channel and pivoting about said inner edges to issue from the channel with the upper tapered ends of the tubings leading.

4. In conjunction with a machine carrying a series of identically oriented workpiece supports which are successively presented by the machine to a loading station for identical and successive receipt by each such successive support of one of a plurality of identical workpieces, each such workpiece comprising a tubing or the like having one rounded or similarly tapered end; apparatus for successively and identically delivering each of a succession of such workpieces to said loading station in a time relationship with the speed of movement of said supports and in an orientation so corresponding to the orientation of the supports on said machine that each respective workpiece upon its arrival at said loading station may be readily delivered to the respective support then presented to the loading station, such apparatus comprising, in combination;

(A) means for supplying to the entrance end of a preselected path of travel a collinear succession of tubings of the class mentioned above, such succession of tubings having a random end-to-end orientation relative to each other;

(B) conveying means including a gating device adjacent said entrance end of said preselected path of travel for receiving and, each time said gating device is actuated, conveying the leading one of said succession of tubings to an exit end of a first zone of such path of travel;

(C) a rotatable drum assembly at said exit end of said first zone for carrying tubings through a circular arc forming a second zone of said preselected path of travel, such assembly including, (a) a horizontally disposed spoked wheel providing a series of tubing receiving horizontal pockets between the spokes of the wheel and evenly spaced about the top of such assembly, (b) a horizontally disposed plate below said wheel and including a vertical open-sided tubing conveying channel associated with each said pocket, such channels being evenly spaced about the outer periphery of said assembly and each having a U-shaped horizontal cross-sectional configuration, (c) means operating during rotation of the drum assembly for vertically rasing each tubing supplied to each said pocket to cause each such tubing to drop into the vertical channel associated with the respective pocket and, (d) a tubing-end detection device at the bottom of each of said vertical channels, each such device operating to detect tapered and untapered lower ends of tubings dropped in the respective channel and causing issuance of such tubings from said assembly at the exit end of said second zone of said preselected path of travel, each said detection device causing issuance first from its associated channel of tapered ends of tubings regardless of the orientation of the tubings when dropped in such channel;

(D) means at said exit end of said second zone for receiving the tubings issuing tapered end first from said drum assembly and conveying such tubings to the exit end of a third zone of said preselected path of travel, and thence successively delivering each tubing so conveyed to said loading station; and (E) means driving said apparatus, including actuation of said gating device and driving said conveying means and rotating said rotatable drum assembly, in a time relationship with the speed of presentation by said machine of successive ones of said workpiece supports to said loading station such that all the tubings of said collinear succession of tubings supplied to the entrance end of said preselected path of travel all arrive at such loading station with their tapered ends correspondingly oriented and so that each next succeeding tubing of said succession of tubings is delivered to the loading station, in accordance with the orientation of the supports on the machine and in accordance with said time relationship, such as to be readily received by each next succeeding workpiece support presented by said machine to the loading station.

5. In conjunction with a machine having thereon a series of vertical workpiece supports which are successively presented by the machine to a loading station for vertical and successive receipt by each such successive support of one of a plurality of identical workpieces each such workpiece comprising a tubing or the like having one rounded or similarly tapered end; apparatus for successively and identically vertically delivering each of a succession of such workpieces to said loading station in a time relationship with the speed of presentation of said supports to said loading station such that each respective workpiece upon its arrival at such loading station may be readily delivered to the respective support then presented to the loading station, such apparatus comprising, in combination;

(A) means for supplying to the entrance end of a preselected path of travel a collinear succession of tubings of the class mentioned above, such succession of tubings having a random end-to-end orientation relative to each other, (B) conveying means including a gating device adjacent said entrance end of said preselected path of travel for receiving and, each time said gating device is actuated, conveying the leading one of said succession of tubings through a first zone of such path of travel to an exit end of such zone;

(C) a rotatable drum assembly at said exit end of said first zone for carrying tubings through a circular arc forming a second zone of said preselected path of travel, such assembly including, (a) a horizontally disposed spoked wheel providing a series of tubing receiving horizontal pockets between the spokes of the wheel and evenly spaced about the top of such assembly, (b) a horizontally disposed disk below said wheel and including a vertical open-sided channel associated with each said pocket such channels being evenly spaced about the outer periphery of said assembly and each having a U-shaped horizontal cross-sectional configuration, (c) means operating during rotation of the drum assembly for vertically raising tubings supplied to said pockets to cause each such raised tubing to drop into the vertical channel associated with the respective pocket, and (d) a tubing-end detection device at the bottom of each of said vertical channels such devices operating to detect tapered and untapered lower ends of tubings dropped in said channels and causing issuance of such tubings from said assembly at the exit end of said second zone of said predetermined path of travel each said detection device causing issuance first from its associated channel of tapered ends of tubings regardless of the orientation of the tubings when dropped in such channel;

(D) means at said exit end of said second zone of said preselected path of travel for receiving the tubings issuing tapered end first from said drum assembly and conveying such tubings tapered end first through a third zone of said preselected path of travel and to the exit end of such zone;

(E) a second rotatable drum assembly at said exit end of said third zone for carrying tubings through a circular arc forming a fourth zone of said preselected path of travel and having an exit end located at said loading station, such assembly including, (e) a horizontally disposed spoked wheel providing a series of tubing receiving horizontal pockets between the spokes of the wheel and evenly spaced about the top of such second assembly, (f) a horizontally disposed disk below said wheel and including a vertical open-sided channel associated with each said pocket such channels being evenly spaced about the outer periphery of said second assembly and each having a U-shaped horizontal cross-sectional configuration, (g) means operating during rotation of the second drum assembly for vertically raising tubings supplied to said pockets to cause each raised tubing to drop into vertical channel associated with the respecetive pocket, and (h) means disposed below the lower ends of said vertical channels for maintaining the tubings supplied to said channels in such channels until such tubings reach said exit end of said fourth zone of said preselected path of travel, such means operating to deliver to said machine each such tubing arriving at such exit end and said loading station; and (F) means driving said apparatus, including actuation of said gating device and driving said conveying means and rotating said rotatable drum assemblies, in a time relationship with the speed of presentation by said machine of successive ones of said workpiece supports to said loading station such that the tubings of said collinear succession of tubings supplied to the entrance end of said preselected path of travel arrive at such loading station with their tapered ends correspondingly oriented and so that each next succeeding tubing of said succession of tubings is vertically delivered to the loading station in accordance with said time relationship such as to be readily vertically delivered to each next succeeding vertical workpiece support presented by said machine to the loading station.

References Cited

UNITED STATES PATENTS 2,962,844 12/1960 Orlando ---------- 198—33 X

ANDRES H. NIELSEN, *Primary Examiner.*

EDWARD A. SROKA, *Examiner.*